United States Patent [19]
Land et al.

[11] 3,771,862
[45] Nov. 13, 1973

[54] SUPERVISORY CONTROL SYSTEM FOR AUTOMATIC TRANSPARENCY PROCESSING AND PROJECTION APPARATUS

[75] Inventors: Edwin H. Land, Cambridge; Stewart Bennett, Concord, both of Mass.

[73] Assignee: Polaroid Corporation, Cambridge, Mass.

[22] Filed: June 9, 1972

[21] Appl. No.: 261,196

[52] U.S. Cl. .................. 352/130, 352/72, 352/74, 352/76, 352/173
[51] Int. Cl. .................................................. G03c 11/00
[58] Field of Search .................. 352/72, 78, 130, 352/74, 173, 76

[56] References Cited
UNITED STATES PATENTS
3,641,896  2/1972  Downey ....................... 352/78 R X
3,641,909  2/1972  Baker ........................... 352/78 R X

*Primary Examiner*—Monroe H. Hayes
*Attorney*—Charles Mikulka et al.

[57] ABSTRACT

A manual override system for automatic photographic transparency processing and projection apparatus adapted to receive cassettes of film, each containing a film processor. The apparatus manipulates the film in the cassette to process it, unless it has already been processed, and projects processed film. A cassette is normally latched into the apparatus until the film has been projected and rewound. The override system comprises an emergency eject control for causing the apparatus to eject the cassette at any point in the operating cycle, and a replay control effective during the projection of film for partially rewinding the film and reprojecting selected portions of it.

9 Claims, 15 Drawing Figures

PATENTED NOV 13 1973 3,771,862
SHEET 1 OF 8
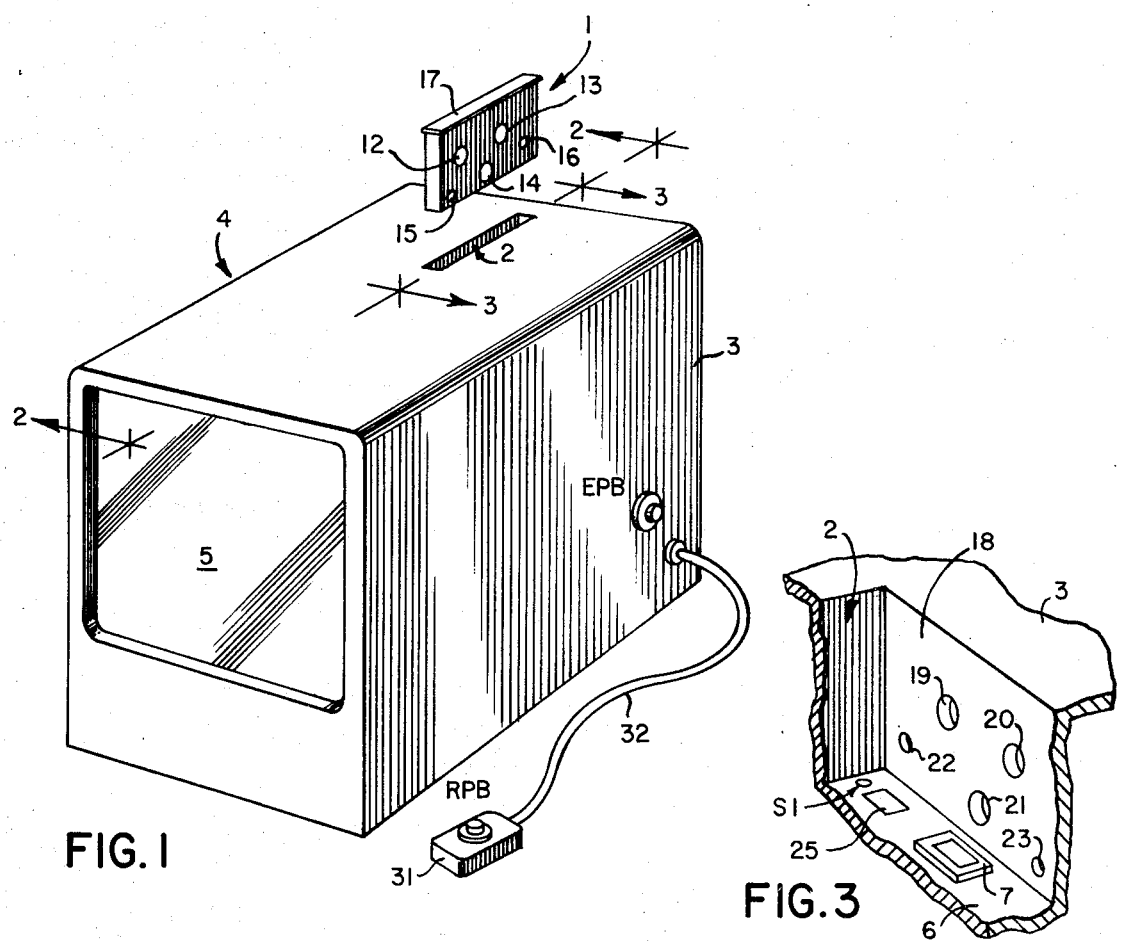
FIG. 1
FIG. 3
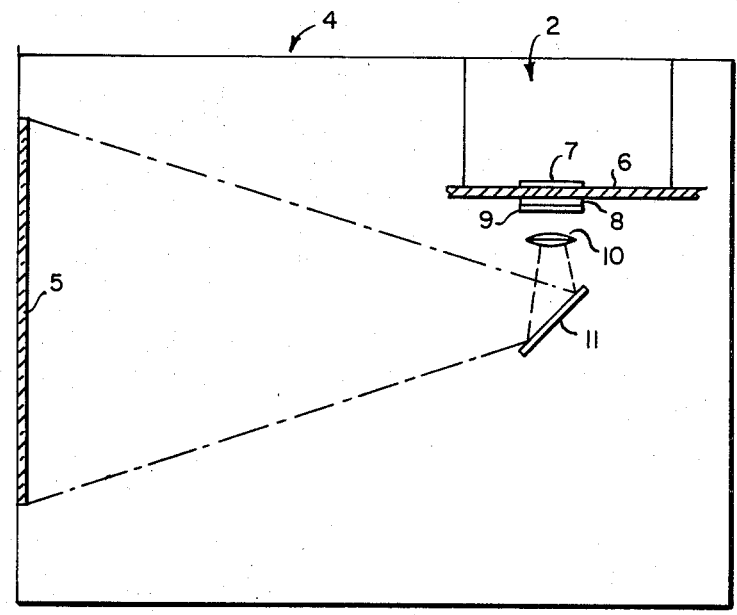
FIG. 2

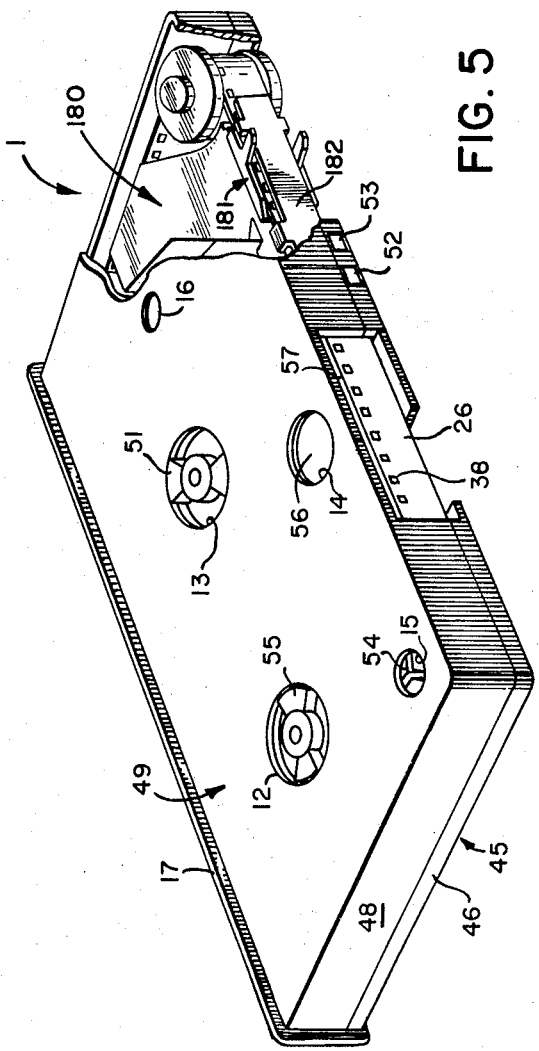
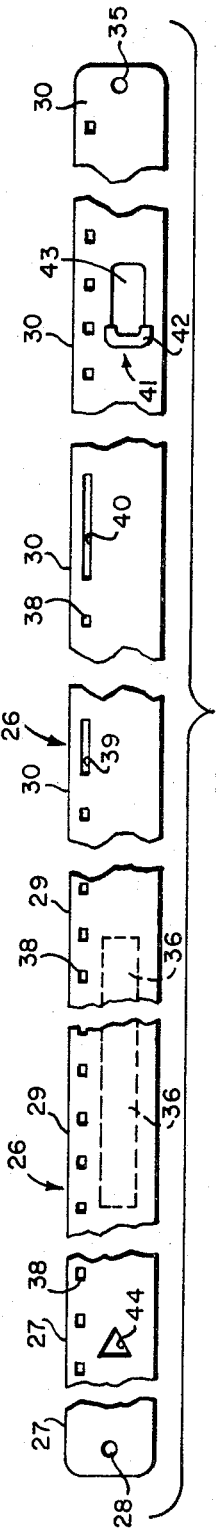

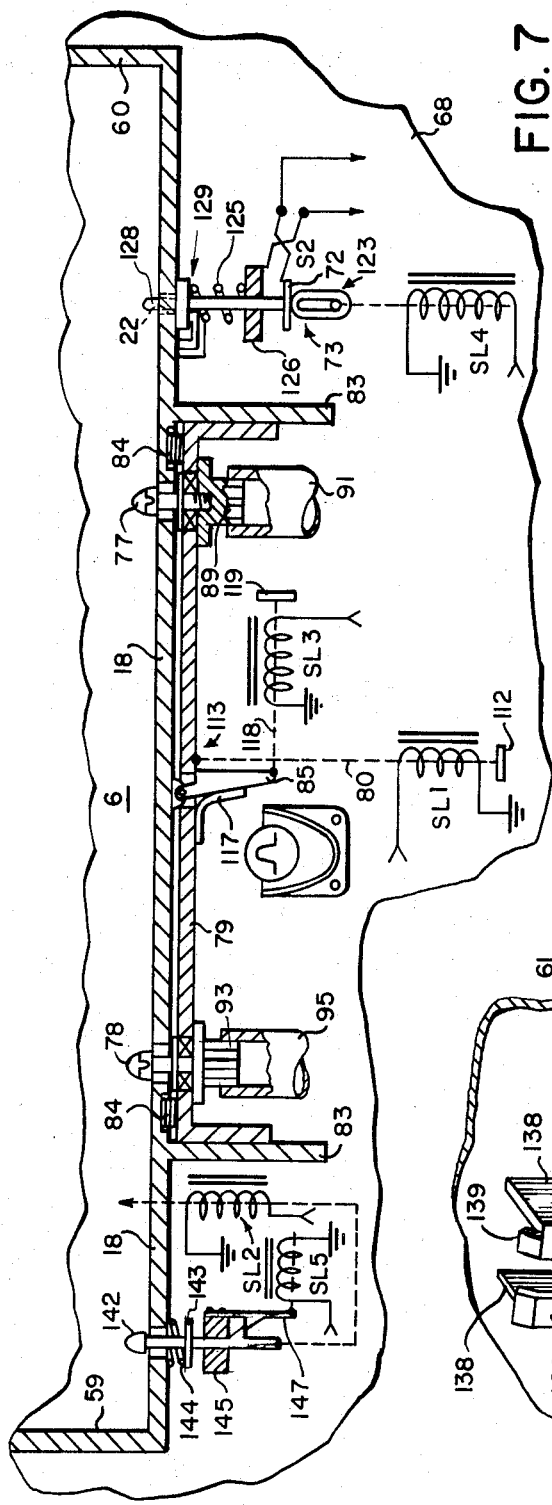

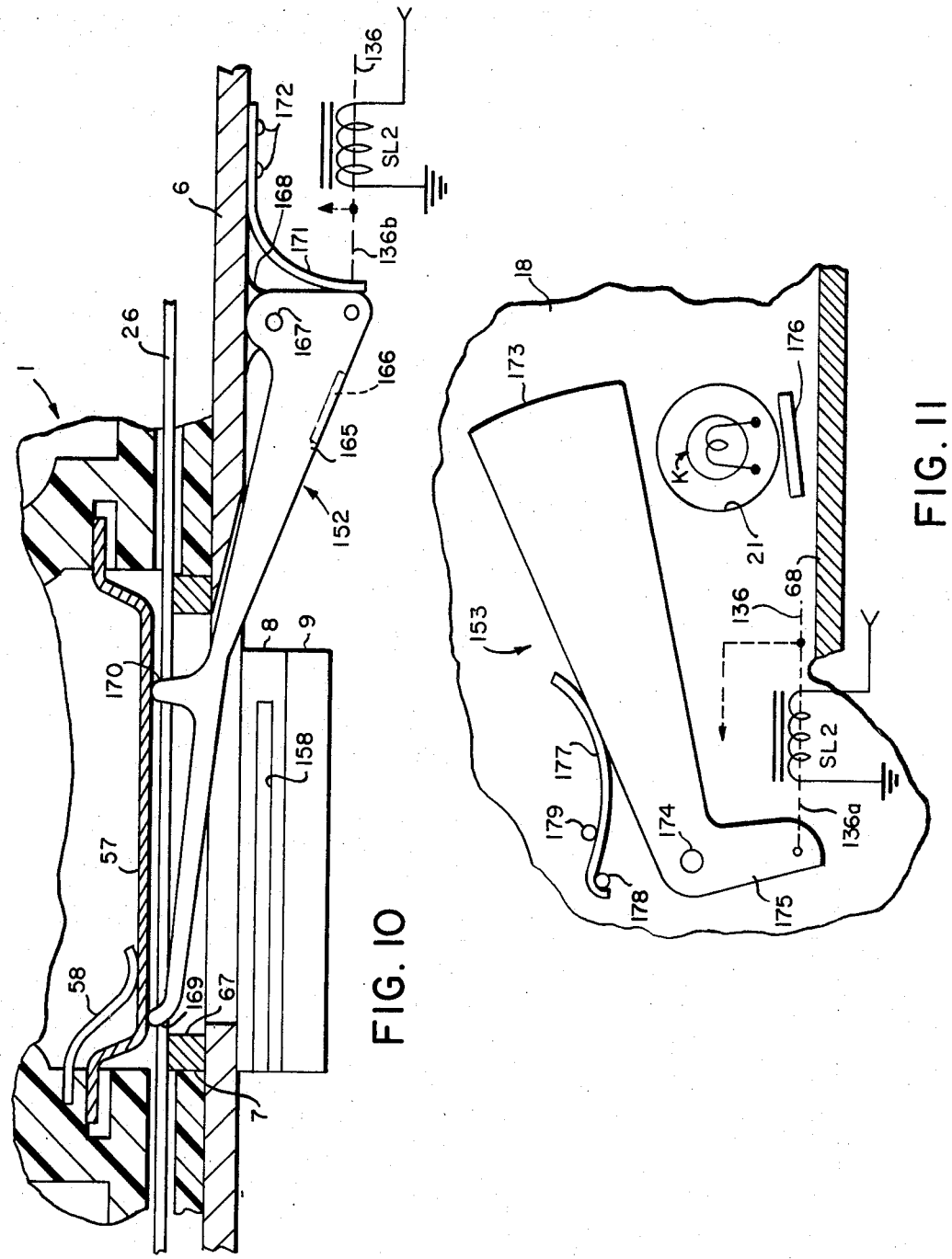

SUPERVISORY CONTROL SYSTEM FOR AUTOMATIC TRANSPARENCY PROCESSING AND PROJECTION APPARATUS

This invention relates to photography, and particularly to a novel supervisory system for automatic film processing and projection apparatus.

Photographic systems have long been available in which photosensitive material is packaged with processing composition, so that photographs may be produced without the aid of a darkroom immediately after the production of a latent image in the camera. This facility had been extended to the production of projection transparencies, as for motion pictures and the like. One system that has been proposed for this purpose is disclosed in U. S. application Ser. No. 227,080, filed on Feb. 17, 1972, by Edwin H. Land for Photographic System for Processing and Projecting Transparencies, and assigned to the assignee of this application.

The system disclosed in the above cited application Ser. No. 227,080 comprises, as the key element, a replaceable film cassette. The cassette contains a strip of film, a supply of processing composition for the film, and an internally programmed processor responsive to manipulation of the film in the cassette for applying the processing composition to the film after its exposure.

The cassette is adapted to be inserted in a camera, for exposure of the film. After exposure, it is inserted into a film drive and projection system. This system comprises a receptacle configured to receive the cassette, and cyclic drive apparatus for manipulating the film in the cassette. The film is manipulated in a sequence determined by a signal provided by the cassette that indicates whether or not the film has been processed.

In response to the insertion of a cassette containing unprocessed film, the film drive and projection apparatus manipulates the film in the cassette in a lighttight environment. That movement of the film activates the processor, developing the film to produce a series of fixed, visible, projectable images. Thereafter, the apparatus manipulates the film in an optical system, causing it to be projected for viewing. The film is then rewound, for storage and subsequent reuse. Finally, the cassette is ejected. In response to the insertion of a cassette containing processed film, the system simply projects the film, rewinds it, and then ejects the cassette.

In order to hold the cassette firmly in position in the film drive and projection system while the film is manipulated, and to prevent the premature withdrawal of the film when it is partially processed, the system provides means for latching the cassette into the system until the cassette is ready for ejection. For various reasons, it may be desirable to defeat this latching mechanism so that the cassette can be removed prior to the end of a normal cycle of operation.

For example, as presently contemplated, the system drives the film in one direction in the cassette for projection, and in an opposite direction to rewind it. The advance and rewind operations are terminated by signals which are produced when the film stops moving in the cassette. Should the film become broken, the motion termination signal might not be produced, and the apparatus would not proceed to the end of the operating cycle to direct the cassette to be ejected. One object of the invention is to facilitate the removal of a cassette from such apparatus when desired.

In the normal operation of the system disclosed in the above copending application Ser. No. 227,080, the film is continuously projected from a starting point near one end to a termination point near the other end. Frequently, a motion picture contains a sequence which the user would like to view again, immediately after seeing the sequence, and without the necessity for reprojecting the entire film. Another object of the invention is to facilitate the instant reprojection of portions, or all, of the film just projected in a system of the kind here considered.

Briefly, the above and other objects of the invention are obtained by the construction of a transparency processing and projection system which has the basic capability of receiving a cassette of film, determining whether or not the film has been processed, and proceeding accordingly in one of two predetermined cycles. Each of these includes a projection cycle, in which the film is normally projected from the beginning to the end of the processed images. In accordance with the invention, this capability of the system is extended by providing means for manually interrupting the projection cycle at any point, and then rewinding the film, either for a predetermined fixed length of time, corresponding approximately to a fixed length of film, or for any larger portion of the film already projected. The apparatus then resumes projection at the point selected.

At any point during the operation of the apparatus, and particulary at any point during the projection of the film, the operating cycle may be interrupted and the cassette ejected. This facility for ejection at any time makes it possible to remove a cassette in the event of a failure such as breakage of the film. The combination of the replay facility with the ejection capability makes it possible to scan cassettes of processed film for features of interest considerably more rapidly than could be done by simply projecting each cassette through its entire film length.

More specifically, a cassette suitable for use with the invention comprises a lighttight housing containing a pair of storage reels on which a strip of film is disposed, extending from one reel to the other over a path including a film gate in the housing through which a portion of the film is exposed for cooperation with a camera, and with the film drive and projection system. The film is initially unexposed, and coiled primarily about one of the reels hereinafter referred to as the supply reel. The other reel, to be referred to as the takeup reel, is connected to the other end of the film, and is adapted to store the film as it is advanced from the supply reel during exposure, or during subsequent manipulations in the film drive and projection system.

The cassette contains a processing system that is initially latched into an inactive state by a detent that is released when the cassette is inserted in the film drive and projection system. A singularity is provided on the film, preferably comprising a hook formed adjacent an aperture in the film near the end connected to the supply reel. In response to movement of the film toward the takeup reel beyond an exposure termination point established in the camera, the hook engages and releases a pressure pad that then resiliently urges the film into contact with a coating nozzle.

The film is provided, along at least one edge, with a regularly spaced series of conventional sprocket holes to enable the film to be incrementally advanced onto the takeup reel during exposure or projection. This series of sprocket holes is interrupted at a first point by a first elongated sprocket hole that serves to terminate advance of the film in the camera. A second sprocket hole is provided, of greater length than the first, which serves a similar purpose in the film drive and projection system by terminating advance of the film at a point beyond the exposure termination point established in the camera. When the film drive and projection system has advanced the film to the second termination point established by the second elongated sprocket hole, it is then rewound.

A pair of contacts on the cassette produce a signal, in a manner described in the above copending application, that indicates whether or not the film has been processed. This signal is sensed by the film drive and projection system when the cassette is inserted into it. If the film has not been processed, rewinding takes place in three stages. As the first step, a short length of the film is drawn onto the supply reel, causing rotation of the supply reel in the rewind sense for the first time since the manufacture of the cassette. Rotation of the supply reel in that sense activates a release mechanism, enabled by the insertion of a cassette in the film drive and projection system, to release the processing composition in preparation for developing the film.

A short interval of time is then allowed to elapse during which the film is motionless. That allows the processing composition to find its way into the coating nozzle. Thereafter, the film is rewound onto the supply reel continuously, at constant linear speed relative to the coating nozzle, while the processing composition is applied to it in a thin, uniform coat. Towards the end of this process, as the film nears its end on the takeup reel, another singularity in the film, which may take the form of an aperture in the film near the end connected to the takeup reel, engages the processor and causes the pressure pad to be cammed out of engagement with the film and latched into a storage position, while closing the coating nozzle aperture.

The film drive and projection system includes a drive mechanism coupled to the supply and takeup reels through slip clutches. As the end of the film is reached on the takeup reel, these shafts slip, and this cessation of motion is sensed to cause the drive system to advance to a projection mode of operation.

In that mode, a snubber reel in the cassette is engaged to prevent motion of the film onto the takeup reel except as it is incrementally advanced by a drive pawl that sequentially engages the sprockets in the edge of the film. A projection lamp is turned on, and directs light through the film to a lens that focuses images from the processed film onto a screen provided as a part of the projection system. The finished film is thus projected for viewing within approximately a minute after the insertion of the exposed film into the film drive and projection system.

At the end of the projection cycle, the film is rapidly rewound onto the supply reel. The cassette is then automatically ejected. Had the film in the cassette been processed prior to its last insertion in the system, operation would commence with projection of the film, and conclude by rewinding the projected film onto the supply reel, and ejecting the cassette as before.

In accordance with the invention, an eject pushbutton is provided on the exterior of the film drive and projection system in convenient position for access by an operator. When momentarily depressed, this pushbutton actuates circuits which cause the film drive and projection system to stop what it is doing, release the cassette, and eject it. This pushbutton is effective at any time following insertion of the cassette into the film drive and projection system.

The replay capability of the system of the invention is attained by the inclusion of a replay pushbutton. Preferably, this pushbutton is mounted in a small housing convenient for grasping in the hand of the viewer, and connected to the housing of the film drive and projection system by a flexible cable. This pushbutton is effective only when the apparatus is projecting film for viewing. When that operation is taking place, depression of the pushbutton causes the system to go into a rewind operation which continues so long as the button remains depressed. Upon the release of the pushbutton, rewind continues for a predetermined time interval sufficient to rewind an approximately fixed number of frames of the processed film. The exact number of frames rewound depends on the correct position of the film on the reels. Projection then resumes, from the point to which the film has been rewound.

Once the region of interest in the film has been reached, it can be repeatedly replayed. Then, if desired, the eject pushbutton can be momentarily depressed to eject the cassette without the necessity for completing the projection of the film.

The system is so constructed and arranged that a cassette can be ejected from the film drive and projection system with the film randomly positioned. When next inserted into the system, the film will be automatically advanced to a termination point, then rewound to a normal storage position. If the film has previously been ejected in a mid position, it will be initially projected from that position. If that is not desired, the replay pushbutton can be depressed to cause the film to be rewound to its starting position.

Since the eject pushbutton serves as an emergency adjunct to permit removal of the cassette under abnormal conditions, as well as for cooperation with the replay pushbutton, it is capable of damaging the film in a cassette. In particular, if it is depressed before the film has been fully processed, some or all of the film may be rendered useless. However, it is not intended for use under such circumstances except when there is no other procedure readily available for removing a cassette from the viewer in the presence of a malfunction. And the opportunity for abuse of the film by misuse of the pushbutton is limited to a period of approximately forty seconds during which an initially unprocessed film is processed.

The system of the invention, the manner in which its components are constructed, and their mode of operation, will best be understood in the light of the following description, together with the accompanying drawings, of a preferred embodiment thereof.

In the drawings,

FIG. 1 is a schematic perspective sketch of a film cassette shown in association with a film drive and projection system in accordance with the invention;

FIG. 2 is a schematic elevational view, with parts shown in cross section and parts broken away, of the film drive and projection system of FIG. 1, taken substantially along the lines 2—2 in FIG. 1;

FIG. 3 is a schematic fragmentary perspective sketch of a portion of a cassette-receiving receptacle in the film drive and projection system of FIG. 1, taken substantially along the lines 3—3 in FIG. 1;

FIG. 4 is a fragmentary schematic plan sketch, with parts broken away, of a film strip forming a part of the cassette of FIG. 1;

FIG. 5 is a schematic perspective sketch, on an enlarged scale, with parts omitted and parts broken away of the cassette of FIG. 1;

FIG. 7 is a fragmentary view similar to that of FIG. 6, showing some of the parts of FIG. 6 in another position assumed during their operation;

FIG. 8 is a fragmentary schematic perspective sketch of a locating pin latching and cassette ejecting mechanism forming a part of the apparatus of FIG. 6;

FIG. 9 is a fragmentary schematic plan view, with parts omitted, parts shown in cross section, and parts broken away, showing an aperture plate blinder mechanism forming a part of the apparatus of FIGS. 1 and 6;

FIG. 10 is a fragmentary schematic cross sectional view, with parts omitted and parts broken away, illustrating a pressure plate lifting mechanism in its operative association with a cassette in the system of FIG. 1;

FIG. 11 is a schematic fragmentary cross sectional elevational view, with parts omitted, parts shown in cross section, and parts broken away, of another blinder mechanism forming a part of the apparatus of FIGS. 1 and 6;

Figure 6:
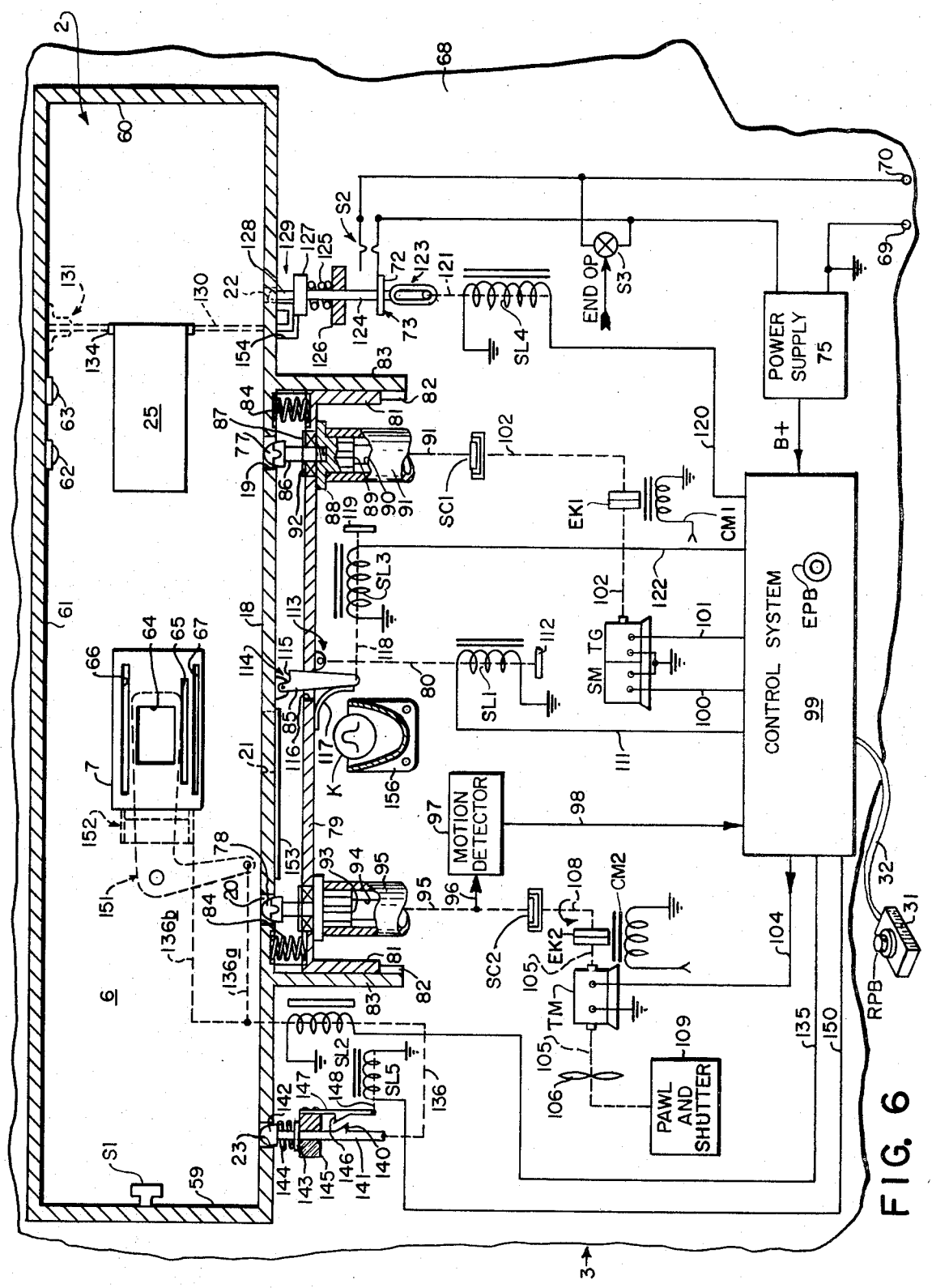
FIG. 6 is a schematic fragmentary plan view, with parts shown in cross section, parts omitted, and parts broken away, illustrating a portion of the film drive and projection system of FIG. 1.

FIG. 1 shows the external cooperative aspects of a transparency processing and projection system embodying the invention. The basic elements of this system are a cassette 1, adapted to be inserted in a pocket 2 formed in the outer housing 3 of a film drive and projection system generally designated 4. A translucent viewing screen 5, on which projected images at times appear, is mounted at the front of the housing 3.

As best shown in FIG. 2, the pocket 2 has a floor 6 on which an aperture plate 7 is mounted. The aperture plate 7 is adapted to extend into the cassette such as 1 and there register with the film in the cassette. Light, supplied in a manner to be described, passes through the film, and thence over a path traversing a suitable framing aperture in the aperture plate 7, a cooperating recess in the floor 6, a blinder housing 8, to be described, and a conventional shutter 9, to a lens 10. The lens focuses an image of the portion of the film selected by the framing aperture on a mirror 11, whence it is reflected to the screen 5.

As shown in FIG. 1, the cassette 1 is provided with a number of light-baffled openings 12, 13, 14, 15 and 16. These openings expose parts adapted to cooperate with corresponding parts of the film drive and projection system to perform various functions in the cassette. Thus, a drive sprocket formed on the takeup reel is accessible through the opening 12. A similar drive sprocket formed on the supply reel is accessible through the opening 13. Projection light is at times admitted to the cassette through the opening 14. A stop can enter, to brake a snubber roll forming a part of the cassette, through the opening 15. The opening 16 serves to admit a locating pin, forming a part of the film drive and projection system, to register the presence of a cassette in the system, to latch the cassette in position for manipulation, and to enable the processing apparatus in a manner to be described.

A flange 17 is formed on the upper end of the cassette 1. This flange aids in grasping the cassette while inserting it in, or removing it from, the pocket 2. It also helps to fix the cassette in position in the film drive and projection system, by engagement with the rim of the pocket 2.

Referring to FIG. 3, parts adapted to enter the openings in the cassette 1 at times enter the pocket 2 through corresponding openings in a side wall 18 of the pocket. Drive sprockets for the supply and takeup reels are adapted to enter through openings 19 and 20, respectively. A light beam for projection enters through an opening 21. The locating pin enters through an opening 22. The snubber roll stop enters through an opening 23.

In addition to the aperture plate 7 described above, the actuating arm of a normally open switch S1 is movably mounted on the floor plate 6. This switch is adapted to be closed when a cassette is inserted in the pocket 2, for purposes to appear.

A foot pedal 25 is movably mounted in the pocket 2 to be depressed by the insertion of a cassette. The foot pedal is connected to an actuating arm extending through the floor plate 6, as will be described below.

As shown in FIG. 1, an eject pushbutton EPB is mounted on the outside of the housing 3 for manipulation by an operator. A replay pushbutton RPB is mounted on a housing 31, and connected to a control system, to be described, in the housing 3 over a flexible cable 32. The cable 32 is preferably long enough so that the pushbutton can be operated from a comfortable viewing position in front of the screen 5.

The photographic system of the invention preferably makes use of a photofinishing process in which a strip of film, following exposure in the camera, is contacted with a single processing composition to form a finished transparency from the latent image or images formed on the film during its exposure. The physical construction of such film, the nature of the photosensitive coating thereon, and suitable processing compositions therefor, are described in the above-cited copending application Ser. No. 227,080. However, the film will next be briefly described.

Referring to FIG. 4, there is shown a film strip generally designated 26, which comprises a leader 27 terminating at an end formed with an aperture such as 28. The aperture 28 serves to connect that end of the film to a takeup reel in the cassette 1.

Behind the leader, which may be in the neighborhood of 18 inches in length, there is a strip 29 of photographically useful film, upon which projectable images may be formed. The strip 29, may be, for example, approximately 52 feet in length for 8mm film.

Following the photographically useful portion of the film is a trailer region generally designated 30. The trailer 30 terminates at another end formed with an aperture 35 by means of which that end of the film is adapted to be connected to a supply reel in the cassette 1.

The film 26 may comprise a base of any suitable transparent material of the kind conventionally used for film bases. On this base is applied, at least over the central portion of the photographically usable length 29 of the film 26, an emulsion comprising a photosensitive coating 36, whereon a series of latent images may be formed with a camera. The photosensitive coating is preferably of one of the forms, described in the above-cited copending application, which can subsequently be processed to form a projectable image on the film base.

The film 26 is formed along one edge with sprocket holes such as 38 at regular intervals adapted to cooperate with a drive pawl, in a manner to be described, in either camera or projector, for incremental advancement of the film. The series of sprocket holes 38 adjacent the trailing end of the film may be interrupted by a first elongated sprocket hole 39. This elongated hole 39 may span, for example, two of the sprocket holes 38.

Further along the film, in the direction of the supply reel end, the series of sprocket holes 38 is again interrupted by a second elongated sprocket hole 40, longer than the sprocket hole 39 and, for example, spanning three of the sprocket holes 38. As will appear, the first elongated sprocket hole 39 establishes an exposure end point in the camera, whereas the second sprocket hole 40 determines a film takeup termination point in the film drive and projection apparatus to be described.

Basically, termination of film advance at the first elongated sprocket hole 39 is attained by the use of a single drive pawl in the camera, which sequentially engages the sprocket holes 38, to advance the film by one frame length at each engagement, in a conventional manner. Toward the end of each such advance stroke, as is conventional, the pawl is cammed down out of engagement with the film. When the single pawl engages the elongated aperture 39, the camming down movement occurs before the film engages the leading edge of the elongated hole, and therefore the pawl may cycle repeatedly without further advance of the film. This serves to effect a termination of film advance for the purposes of exposure adjacent the end of the region of photographically useful emulsion, to alert the photographer, by the somewhat different sound produced when the pawl skips the film, that his cassette should be replaced.

The film drive and projection system is provided with a double pawl, comprising two integral pawls spaced apart by one frame length, each pawl being of the same shape as the single pawl in the camera. When the first elongated aperture 39 is encountered, the trailing pawl of the pair serves to engage the leading edge of the aperture 39 to cause the film to be advanced without interruption. For normally spaced sprocket holes 38, both of the pawls engage the film in sequential sprocket holes. However, when the second elongated sprocket hole 40 is encountered, the pawls will pass through it without film engagement, and thereby terminate film advance in the same manner as did the single pawl upon engagement of the double length sprocket hole 39.

Formed on the trailing end 30 of the film 26, beyond the exposure advance termination portion just described in the direction of the supply reel end of the film 26, is a singularity generally designated 41 comprising a detent engaging element here shown as an aperture 42 formed in the film, adjacent which a projecting bump 43 is formed, as by pressure, heat and pressure, or the like. The singularity 41 thus comprises a hook adapted to engage a process control actuating element, as the film is moved in the direction of the takeup reel.

Formed on the leader end 27 of the film 26 is another detent engaging means, here shown as an aperture 44 in the central region of the film. This aperture serves to actuate a valve member forming a part of the processing apparatus in the cassette.

FIG. 5 shows schematically the pertinent elements of an internally programmed cassette 1 adapted for use in the system of the invention. The cassette is fully described in the above-cited copending application Ser. No. 227,080, to which reference is made for the details of its construction. Thus, it will be described here only to the extent necessary to understand its cooperation with the other components of the system.

The cassette comprises a housing formed of any suitable opaque material such as metal, plastic, or the like, and preferably manufactured in two cooperating parts. As shown in FIG. 5, the housing parts comprise a base generally designated 45, having side walls 46. The walls 46 cooperate with interfitted walls 48 of a cover generally designated 49. The walls 48 overlap the corresponding segments of the walls 46 to form the sides of the housing of the cassette 1.

A cover plate 50 is formed integral with the walls 48, and completes the upper side of the housing as seen in FIG. 5. The selection of the parting lines between the walls 46 and 48 is a matter of convenience. In particular, the choice is preferably so made that the base 45 can serve as a support upon which all of the additional fixed and moving internal parts of the cassette may be assembled before the cover 49 is put in place. When the cover is placed in position, it may be formed integral with the base 45 by heat sealing, or by a suitable adhesive, or the like.

The base and cover parts form, when assembled, the end flange 17 that serves to support and locate the cassette 1 in either a camera, or in the film drive and projection system of FIG. 1.

Rotatably disposed within the cassette housing is the supply reel, not shown, to which the supply end 30 of the film 26 (FIG. 4) is attached. A sprocket schematically indicated at 51 may be formed integral with the supply reel to adapt the reel to be driven about its axis of rotation. Access to the sprocket 51 may be provided through the aperture 13 in the cover plate 50, light-baffled by suitable conventional means, not shown.

Initially, the film 26 is in its unexposed state and coiled primarily about the supply reel. In its path from the supply reel, the film 26 first encounters a bobulator roll, and passes therefrom around a conventional idler roll journalled for rotation in the housing, and thence through film processing means 180, comprising a coating nozzle 181 and a pressure pad 182, all described in detail in the above-cited copending application.

In addition to the apparatus for processing the film, the film processing means comprises a signal generator for producing an external electrical condition signal on terminals schematically indicated at 52 and 53, to indicate whether or not the processing means has been actuated. In particular, this signal is a closed circuit path between the terminals 52 and 53, completed by a valve member before the film is processed. Near the end of the processing operation, the valve member is moved into another position, opening the circuit path between the terminals 52 and 53.

Beyond its path through the film processing means, a portion of the film 26 is exposed in a region between two light-baffled apertures forming a film gate in the housing. A wall portion formed integral with the cassette housing forms an exposed chamber behind the film 26 in the film gate for the purpose of admitting projection light. Light enters the cassette through the port 14 formed in the cover plate 50 in directions normal to the cover plate 50. A mirror in a prism 56 exposed by this port directs this light downwardly through the film 26 in the film gate for the projection of images on the film through the lens 10 (FIG. 2).

Also disposed in the light-admitting chamber behind the film passing through the film gate is a conventional pressure plate 57, located between the prism and the film, and biased by a spring 58 into engagement with the film (FIG. 10). The pressure plate serves in the conventional manner to cooperate with a camera, by locating the focal plane of the film during exposure.

An aperture, not shown, is provided in the pressure plate to pass light entering through the prism assembly 56 through a selected frame of the film 26, after the film is processed. It is preferred that the aperture be somewhat larger than the frame to be projected so that the aperture in the aperture plate 7 (FIGS. 2 and 3) serves as the limiting aperture bounding the projected frame.

The film 26 next passes over a conventional snubber roll having a hub 54 accessible through a port 15 in the cassette housing, and finally passes to a connection with a takeup reel having a drive sprocket 55 accessible through the port 12 in the housing.

The snubber roll may be of entirely conventional construction. It is provided with a hub portion schematically indicated at 54 that is adapted to protrude through the (suitably light-baffled) aperture 15 in the cover panel 50 for engagement by a stop member, comprising a part of either the camera or of the film drive and projection system, that is engaged when the film is to be incrementally advanced by a pawl for exposure or projection purposes.

The drive sprockets 51 and 55 of the supply and takeup reels, respectively, are adapted to be engaged by corresponding drive sprockets comprising a part of a camera, or of the film drive and projection apparatus to be described. In the film drive and projection apparatus, both supply and takeup reels are adapted to be driven through slip clutches. In the camera, only a drive for the takeup reel need be provided. This drive comprises a slip clutch connected to a sprocket driving the takeup reel drive sprocket 55, in cooperation with a drive pawl for sequentially engaging a series of the sprocket holes 38 formed in the film 26, along a portion of the edge of the film in the film gate.

When the snubber roll is stopped by engagement of its hub 54 as described above, operation of either the camera or of the film drive and projection system to incrementally advance the film towards the takeup reel, by engagement of a pawl with the sprocket holes in the film 26, will momentarily loosen the film from engagement with the stationary snubber roll and allow the slip clutch driving the takeup reel sprocket 55 to take up that increment of the film advanced by the pawl. Between engagements of the pawl, the slip clutch prevents the takeup reel from advancing the film.

In the film drive and projection system to be described, the snubber roll is engaged only while the film is to be incrementally advanced onto the takeup reel. When the film is rewound onto the supply reel, the snubber roll is disengaged and acts as an idler. As will appear, that may occur either during the processing of the film while rewinding, or during subsequent rewinding of the processed film after projection.

Further details of the film drive and projection system 4 will next be described, with reference first to FIG. 6. As there shown, the pocket 2 that is adapted to receive the cassette described above is, in part, formed in the housing 3 by two walls described above; i.e., the floor plate 6 and the wall 18 normal thereto, through which certain cooperating parts of the system extend. The pocket 2 is further defined by end walls 59 and 60, and a side wall 61 opposite the wall 18. Along the wall 61 are mounted a pair of suitably insulated contacts 62 and 63 that are adapted to engage the terminals 52 and 53 formed on the cassette.

The aperture plate 7 referred to above that is mounted on the floor plate 6 is shown in FIG. 6 to comprise a framing aperture 64 that defines the margins of the portion of the film in the cassette to be projected. Beside this aperture 64 is a slot 65 through which a film drive pawl, to be described, is adapted to protrude for engagement with film in a cassette in the pocket 2. A symmetrical pair of slots 66 and 67 are also formed in the aperture plate 7. These slots are adapted to receive a pair of pressure plate raising arms, to be described, which serve at times to disengage the pressure plate 57 of FIG. 5 from the film 26, for purposes to appear.

A floor plate 68 is formed integral with the housing 3, coplanar with the floor plate 6 and normal to the wall 18. On this plate 68 are mounted most of the moving parts of the film drive and projection apparatus to be described.

Energy for the film drive and projection apparatus is arranged to be supplied from a suitable source of alternating current, such as a 60Hz, 120 volt source, connected to a pair of terminals 69 and 70. One of these terminals is shown connected to a reference ground, for convenience, and the other is connected over contacts of a mechanically operated switch S2, in parallel with an electronic switch S3, to a conventional DC power supply 71. When energized, the power supply 71 produces a DC output voltage at any convenient potential B+ with respect to ground.

As will appear, the switches S2 and S3 are normally open. The switch S2 is closed by a collar 72 formed on a locator pin 73 when a cassette is inserted in the pocket 2. The locator pin then extends into the cassette to enable the tear-tab release mechanism and latch the cassette in the pocket.

A drive sprocket 77 for the supply reel of a cassette in the pocket 2, and a drive sprocket 78 for the takeup reel, are mounted on a spindle plate 79. These drive sprockets are adapted to protrude through the ports 19 and 20 in the wall 18 when the spindle 79 is driven toward the wall 18 by the output shaft 80 of a solenoid SL1.

The spindle plate 79 comprises a bar of metal or the like, provided with integral guide flanges 81 at its ends. The flanges 81 are slidable in ways, suggested at 82, formed integral with walls 83. The walls 83 are formed integral with the wall 18.

The spindle plate 79 is normally urged to the position shown in FIG. 6 by a pair of compression springs 84 located between the wall 18 and the spindle plate 79. When so moved by the shaft 80, the spindle plate moves toward the wall 18, where it is held by a latch 85, to be described below.

The sprocket 77 is formed integral with a shaft 86. A collar 87 is formed integral with the shaft 86. Another collar 88 is detachably secured to the shaft 86 by means schematically shown as cooperating threads formed on the parts. This collar 88 may be integral with a splined extension 89 that engages corresponding splines 90 formed in a cylindrical bore in the end of a drive shaft 91. The shaft 86 and the collars 87 and 88 cooperate with bearings schematically indicated at 92, mounted in the spindle plate 79, to allow the shaft 86 to rotate in the spindle plate, while preventing it from being translated along its axis of rotation relative to the plate 79. The splines 90 and the splined extension 89 cooperate to allow the shaft 86 to be driven by the shaft 91, while allowing relative translational motion between the shafts 86 and 91. Thus, the shaft 91 may be fixed relative to the base plate 68 against translational motion, while rotatable with respect thereto.

The sprocket 78 may be rotatably mounted against translational motion in the spindle plate 79 by means identical to those just described with respect to the sprocket 77. A translational coupling is provided, comprising splines 93, connected to the sprocket 78 and cooperating with splines 94 formed in a shaft 95, in the manner described above, to allow the sprockets 78 to be drivably connected to the shaft 95 while free to slide axially with respect thereto. The shaft 95 is also translationally fixed relative to the plate 68, but mounted for rotation thereon.

The shaft 91 is connected to one side of a conventional slip clutch SC1, and the shaft 95 is similarly connected to one side of a conventional slip clutch SC2. Each of the shafts 91 and 95 is at times driven through its associated slip clutch, and at other times is driven from the associated sprocket 77 or 78, as will appear.

The shaft 95 is connected by means schematically indicated at 96 to a motion detector 97. The motion detector, to be described below in connection with FIG. 13, produces an output signal in response to rotation of the shaft 95 in either direction. This signal is applied over a lead 98 to a control system schematically indicated at 99.

The control system 99 normally operates in a sequence determined by the signal appearing on the terminals 62 and 63 when a cassette is received in the pocket 2. The selected operating sequence may be modified by depression of the eject pushbutton EPB, or by manipulation of the replay pushbutton RPB, as will appear.

The control system 99 at times supplies current over a lead 100 to operate a conventional DC motor SM. The motor SM drives the input shaft of a conventional tachometer generator TG. The generator TG provides an output signal, proportional to the speed of the motor SM, that is applied to the control system 99 over a lead 101. This signal is applied to a speed control circuit for the motor SM, to be described.

The motor SM drives an output shaft 102. The shaft 102 drives the input side of a conventional electromagnetic clutch EK1. When the coil CM1 of the clutch EK1 and the motor SM are both energized, the slip clutch SC1 is driven to cause operation of the supply reel drive shaft 91. The clutch EK1, and a similar clutch provided in the drive for the takeup reel, serve to decouple the film and its storage reels from the position of the drive mechanism that is not currently energized.

The control system 99 at times supplies operating current over a lead 104 to energize another conventional DC motor TM. The motor TM drives a shaft 105.

The shaft 105 is connected to the input side of another conventional electromagnetic clutch EK2. The output side of the clutch EK2 is connected to a shaft 108 that drives the input side of the slip clutch SC2. When the shaft 105 is driven by the motor TM, the magnet CM2 will be energized and the shaft 95 will be driven through the electromagnetic clutch EK and the slip clutch SC2. When the motor TM is deenergized, the shaft 108 is at times rotated in the opposite direction by the shaft 95; at those times, the deenergized clutch EK2 uncouples the shaft 105 from the shaft 108.

The shaft 105 also operates a fan schematically indicated at 106, and a pawl and shutter mechanism 109, to be described. The fan 106 supplies air for cooling a projection lamp, to be described, and may also be used to supply air to a cassette in the pocket 2, through suitable light-baffled entrance and exit ports in the cassette housing, not shown, to aid in drying the film in a cassette after it is coated with processing composition.

The control system 99 at times supplies operating current to energize the solenoid SL1 over a lead 111. The solenoid SL1 is provided with an armature 112 connected to the output shaft 80. The shaft 80 is connected to the spindle plate 79 by means schematically indicated at 113. When energized by a pulse of current, the solenoid SL1 drives the spindle plate 79 towards the wall 18 against the springs 84.

The latch 85 is pivotally connected to the wall 18 as indicated at 114. A tooth 115 on the latch 85 passes through an aperture 116 in the plate 79 as the spindle plate is driven toward the wall 18, and engages the back side of the plate 79 to hold the spindle plate in drive position, as shown in FIG. 7, after the solenoid SL1 is deenergized. A resilient spring 117 connected at one end to the plate 79 urges the latch 85 toward the positions shown in FIGS. 6 and 7.

The output shaft 118 of a solenoid SL3 is connected to the free end of the latch 85. The shaft 118 is connected to the armature 119 of the solenoid SL3.

The solenoid SL3 is at times supplied with a pulse of energizing current from the control system 99 over a lead 122. When the solenoid SL3 is energized, and when the latch 85 is in the position shown in FIG. 7, holding the plate 79 in drive position, the shaft 118 will disengage the latch 85 and allow the spindle plate 79 to be driven back to the position shown in FIG. 6 by the springs 84.

The armature 121 of a solenoid SL4 is connected, with lost motion as indicated at 123, to one end of the locating pin generally designated 73. The locating pin 73 has a shaft 124 that is urged toward the wall 18 by a spring 125 acting between a collar 127 formed integral with the shaft 124 and a support 126 fixed to the floor plate 68.

A cassette engaging end 128 of the locating pin 73 is adapted to protrude through the port 22 when a yoke 129 is removed to allow the spring 124 to drive the locating pin toward the wall 18. The yoke 129 normally engages the collar 127 to hold the locating pin in the position shown in FIG. 6. The yoke 129 is connected to an arm 130 that is formed integral with the foot plate 25 described above.

As best seen in FIG. 8, the yoke 129 is formed at the upper end of an upstanding arm 137. Ears 138 formed at the sides of the yoke 129 serve to space the collar 127 on the locating pin from the wall 18 when the shaft 124 of the locating pin engages the yoke. Inclined tabs 139 are formed on the upper sides of the yoke 129 to guide it into the position shown in FIG. 6, as will appear.

The arm 137 extends down through a recess 154 in the plate 68 to a connection with the arm 130. Referring again to FIG. 8, the arm 130 is pivoted to an extension of the wall 61 below the floor plate 6 as schematically indicated at 131. A resilient ejecting spring 132 having one end connected to the wall 61 urges the arm 130 upwardly as seen in FIG. 8. The arm 130 has an upstanding extension 133 connected to and formed integral with the pedal 25. Thus, the pedal 25 is normally slightly above the floor plate 6.

When a cassette is inserted in the pocket 2, the pedal 25 is depressed, causing the arm 130 to move downwardly against the spring 132, and withdrawing the yoke 129 from the locating pin to allow the locating pin to move to the position shown in FIG. 7. In that position, the collar 127 on the locating pin 127 holds the yoke 129 down, thus latching the pedal 25 down against the spring 132.

The pin 73 remains in the position shown in FIG. 7 until the solenoid SL4 is supplied with a pulse of energizing current to retract it to the position shown in FIG. 6. As will appear, when the solenoid SL4 is energized, the pedal 25 is released, to eject a cassette in the pocket 2 to a position partially raised out of the pocket. At the same time, the yoke 129 comes up behind the collar 127 to resume the position shown in FIG. 6, where it will hold the locating pin after the solenoid SL3 is deenergized.

The control system 99 at times supplies operating current to the winding of a solenoid SL2 over a lead 135. The solenoid SL2 has an armature 136 connected to a shaft 141 on which a snubber stop 142 is formed. The snubber stop 142 is adapted to protrude through the port 23 in the wall 18 when the shaft 141 is moved by the solenoid SL2. A collar 143 is formed on the shaft 141, and engages a spring 144 that is compressed between the collar and the wall 18, to urge the snubber assembly to the position shown in FIG. 6.

When the solenoid SL2 is energized, driving the snubber stop 142 through the port 23, a tooth 140 on the end of the arm 141 catches a tooth 146 formed on a resilient arm 147. The arm 147 is connected to a support 145, formed integral with the floor plate 68, in which the shaft 141 is slidably received.

When the teeth 147 and 146 are engaged, the snubber stop remains in the position protruding through the wall 18, as shown in FIG. 7, and latched in position by the arm 147. The parts remain in that position after the solenoid SL2 is deenergized, and until a solenoid SL5 is energized.

The solenoid SL5 has an output shaft 148 connected to the arm 147. When energized, the solenoid SL5 releases the latch comprising the arm 147, and its tooth 146, allowing the spring 144 to drive the snubber stop back to the position shown in FIG. 6. An energizing pulse of current for the solenoid SL5 is at times supplied from the control system 99 over a lead 150.

The armature 136 of the solenoid SL2 is provided with a first extension 136a that is connected to an aperture plate blinder mechanism generally designated 151, to be described below in connection with FIG. 9. The extension 136a of the armature 136 is also connected to a blinder 153, to be described in connection with FIG. 11, which closes the port 21 in the wall 18 at times to prevent the entry of light through that port. The armature 136 of the solenoid SL2 is also provided with a second extension 136b that is connected to a pressure plate lifting assembly generally designated 152, to be described below in connection with FIG. 10. When a pulse of current is supplied to the solenoid SL2, and the armature 136 is actuated, the blinder assemblies 151 and 153, and also the pressure plate control mechanism 152, are moved to positions, to be described, in which they are held by the latch 147 until the solenoid SL5 is energized to release the latch.

A projection lamp K is mounted in any suitable fitting on the plate 68, and is adapted, when energized in a manner to be described, to supply light for projection. For this purpose, a condensing system here shown as a parabolic reflector 156 is mounted on the plate 68 behind the lamp K to direct light produced by the lamp through the port 21 in the wall 18. As will be apparent to those skilled in the art, the reflector 156 may more fully surround the lamp K, but the parts have been shown somewhat separated for convenience of illustration.

FIG. 9 shows the exit aperture blinder mechanism 151 in more detail. As shown, the blinder housing 8 is mounted on the plate 6 beneath the aperture plate 7 in FIG. 6. See also FIG. 2. The housing 8 is provided with an aperture 157 somewhat larger than the aperture 64 in the aperture plate 7 of FIG. 6, to allow light to pass unimpeded through the aperture plate when the blinder 151 is opened. A slot 158 formed in the housing admits a blade 159 of the blinder 151, such that the blade 159 closes the aperture 157 when the blade is moved clockwise in FIG. 9.

The blade 159 is formed as one arm of a bell crank pivoted at 160 to the plate 6. Another arm 161 of the bell crank is connected to the armature 136a of the solenoid SL2.

The blinder mechanism 151 is urged to a position in which the blade 159 closes the aperture 157 by a resilient spring 162 engaging the arm 161. The spring is fixed to the plate 6 by means shown schematically as pins 163 and 164. The apparatus is shown in FIG. 9 in the position assumed when the solenoid SL2 has been energized and the latch 147 in FIG. 6 is engaged.

FIG. 10 shows the pressure plate control mechanism 152. Basically, this apparatus comprises a pair of levers 165 formed integral with a spacing bar 166 that connects them together. The levers 165 are pivoted as indicated at 167 to a support 168 formed integral with the floor plate 6. Each of the levers 165 has an outer pressure plate lifting arm 169 formed at the end thereof, and an inner pressure plate lifting arm 170 formed intermediate its ends.

A resilient spring 171 having one end fastened to the plate 6 as suggested at 172 engages the levers 165 and urges them to the position shown in FIG. 10. In that position, the arms 169 and 170 engage the pressure plate 57 in a cassette 1 inserted in the housing, and raise it upwardly away from the film 26 against the action of its biasing spring 58. When the solenoid SL2 is energized, the levers 165 are moved counterclockwise in FIG. 10, bringing the arms 169 and 170 down through the slots such as 67 formed in the aperture plate 7 and allowing the pressure plate 57 to resume engagement with the film 26.

FIG. 11 shows the blinder mechanism 153 for the port 21 in the wall 18. As suggested in FIG. 11, the blinder comprises a blade 173 formed as one arm of a bell crank pivoted to the wall 18 at 174. The bell crank has another arm 175 connected to the extension 136a of the solenoid SL2.

The blade 173 is shown in FIG. 11 in the position assumed when the solenoid SL2 has been energized and the latch 147 in FIG. 6 is engaged. In that position, the lamp K is able to transmit light through the port 21. The blade 173 is urged into a position in which it engages a stop 176 formed integral with the wall 18, and thereby closes the port 21, by a resilient spring 177 engaging the blade 173 and fixed at one end to the wall 18 by means shown as pins 178 and 179 fixed to and extending from the wall 18.

Figure 12:
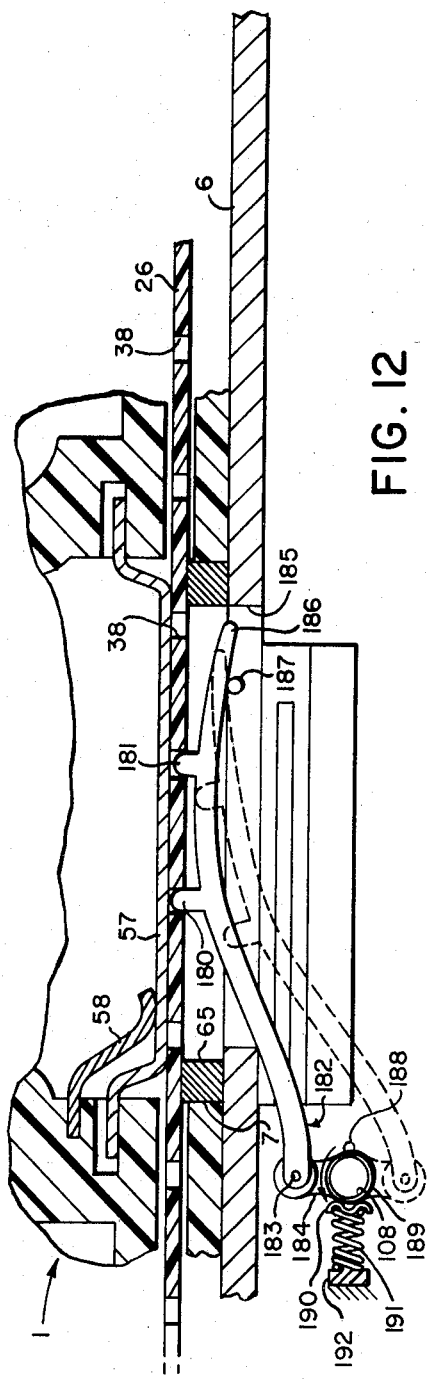
FIG. 12 is a fragmentary schematic cross sectional view of a portion of a cassette in position in the film drive and projection system of FIG. 1, illustrating the incremental film advance mechanism, with parts shown in cross section, parts omitted, and parts broken away.

FIG. 12 schematically illustrates the film advance pawl mechanism. The apparatus comprises a pair of film drive pawls 180 and 181 formed on a lever generally designated 182. The pawls 180 and 181 are adapted to engage sequential sprocket holes 38, to advance the film incrementally. For that purpose, the lever 182 is pivoted as indicated at 183 to crank arms 184 (see also FIG. 15). The crank arms 184 are fixed to the shaft 108 that is driven by the motor TM in FIG. 6.

As shown, the lever 182 passes through a suitable aperture 185 formed in the floor plate 6, and thence through the slot 65 in the aperture plate 7 into engagement with the film. An end 186 formed on the lever 182 rides on a pin 187 secured to the floor plate 6. Thus, as the shaft 108 rotates, the pawls 180 and 181 drive the film 26 to the left in FIG. 12 until they are brought down out of engagement with the film in response to rotation of the crank arms 184. Thereafter, the pawls are brought up beneath the plane of the film, as suggested by the dotted lines in FIG. 12, back to a position in which they can engage the next pair of sprocket holes 38, and then undergo another advance stroke.

A projection 188 formed on an extension 189 of a hub of the crank arms 184 is adapted to releasably engage a detent 190 urged against the hub 189 by a spring 191 compressed between the detent 190 and a fixed support 192. That causes the pawl to stop in the dotted line position, out of engagement with the film, when the motor TM stops driving the shaft 108.

As described above, when the pawls 180 and 181 engage an elongated sprocket hole such as 39 in FIG. 4, the film will continue to be advanced. However, when a further elongated sprocket hole, such as 40 in FIG. 4, is encountered, having a spacing equal to three of the sprocket holes 38, both pawls 180 and 181 will fail to engage the film, and film advance will cease, even though the shaft 108 continues to rotate.

Figure 13:
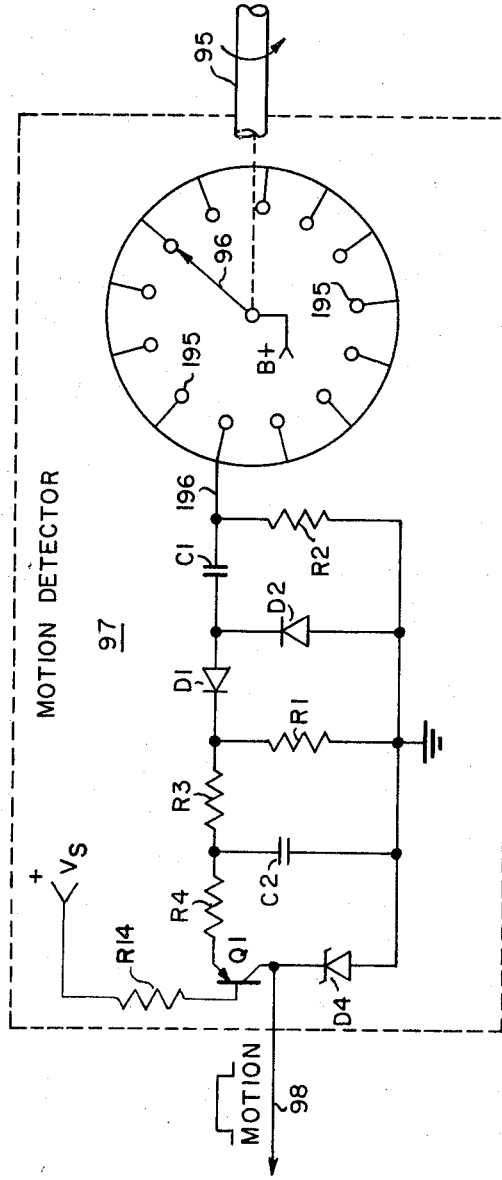
FIG. 13 is a schematic wiring diagram of a motion detector forming a part of the apparatus of FIGS. 1 and 6.

FIG. 13 shows the details of the motion detector 97. As shown, the apparatus receives a mechanical input from the shaft 95 by means of a connection to a commutator wiper 96 forming a portion of a rotary switch that includes a plurality of interconnected contacts 195 adapted to be sequentially engaged by the wiper 96 as the shaft 95 is rotated in either direction. Alternatively, as will be apparent to those skilled in the art, the contacts 195 can be formed as lands on the shaft 95, spaced by intermediate grooves filled with a suitable insulating material, such as an epoxy resin or the like. The commutator arm 96 may then be formed as a slidable contact sequentially engaging these lands on the shaft as it rotates.

The arm 96 is connected to the supply terminal at B±, and thereby supplies that voltage over any engaged one of the contacts 195 to a lead 196. The lead 196 is connected to ground over a first path extending in series through a capacitor C1, a diode D1, and a resistor R1.

A resistor R2 completes a second path from the lead 196 to ground. A third path extends through the capacitor C1 and from the cathode to the anode of a diode D2 to ground. A discharge path for the capacitor C1 thus extends from one side of the capacitor through the resistor R2, and thence from the anode to the cathode of the diode D2 and then to the other side of the capacitor C1. This discharge path is effective to discharge the capacitor C1 between engagements of the wiper 96 and the contacts 195.

A charging path for a second capacitor C2 extends from the lead 196 through the capacitor C1, through the diode D1 in its forward direction, through a resistor R3, and thence through the capacitor C2 to ground. The resistor R1 is connected between ground and the junction of the resistor R3 and the diode D1. An output circuit path extends across the capacitor C2, from its upper terminal through a resistor R4, from the emitter to the collector of a conventional PNP transistor Q1, and thence from the cathode to the anode of a zener diode D4 to ground and the lower terminal of the capacitor C2.

The base of the transistor Q1 is normally reverse-biased with respect to the emitter by a reference potential $+V_s$ applied through a resistor R20. The voltage $V_s$ may be derived from the power supply voltage B+ through a voltage divider, and is selected to be somewhat higher than the breakdown voltage of the zener diode D4. For example, if the breakdown voltage of the zener diode is about 7 volts, the voltage $V_s$ may be about 8 volts.

The capacitor C2 is thus charged through the resistor R3, each time the capacitor C1 is charged, to a voltage that reaches a relatively constant value larger than the reference voltage $V_s$ at the shaft speeds encountered. Between charging intervals, the capacitor C2 slowly discharges through the resistor R3 in series with the resistor R1, while the capacitor C1 rapidly discharges through the resistor R2. When the voltage across the capacitor C2 reaches and exceeds the voltage $V_s$, the zener diode D4 will break down and current continuously flows through the zener diode, the transistor Q1, and the resistor R4 to produce a positive MOTION signal at essentially constant voltage across the diode D4.

The capacitor C1 serves to isolate the output circuit from the lead 196, to prevent false operation when the wiper 96 stops on one of the contacts 195. The diode D2 and the resistor R2 serve to discharge the capacitor C1 between engagements of the contacts.

The components of the motion detector circuit are selected by conventional design methods such that when the wiper 96 is rotated by the shaft 95 at a speed at least equal to the projection takeup speed, which is normally lower than the rewind speed, the capacitor C2 will be charged through the capacitor C1 and the resistor R3 in series at a rate sufficient to exceed the reference voltage $V_s$ at which the transistor Q1 will conduct and the zener diode D4 will break down, causing an output signal to appear across the diode D4 as long as the motion continues. When motion of the shaft 95 stops, the capacitor C2 will discharge and the transistor Q1 will be cut off, causing the voltage across the diode D4 to drop abruptly to ground. The output signal across the diode D4 will thus exhibit relatively sharp rise and fall times. The fall time of this signal is utilized in the circuit of FIGS. 6 and 15, to detect the cessation of shaft motion.

Figure 14:
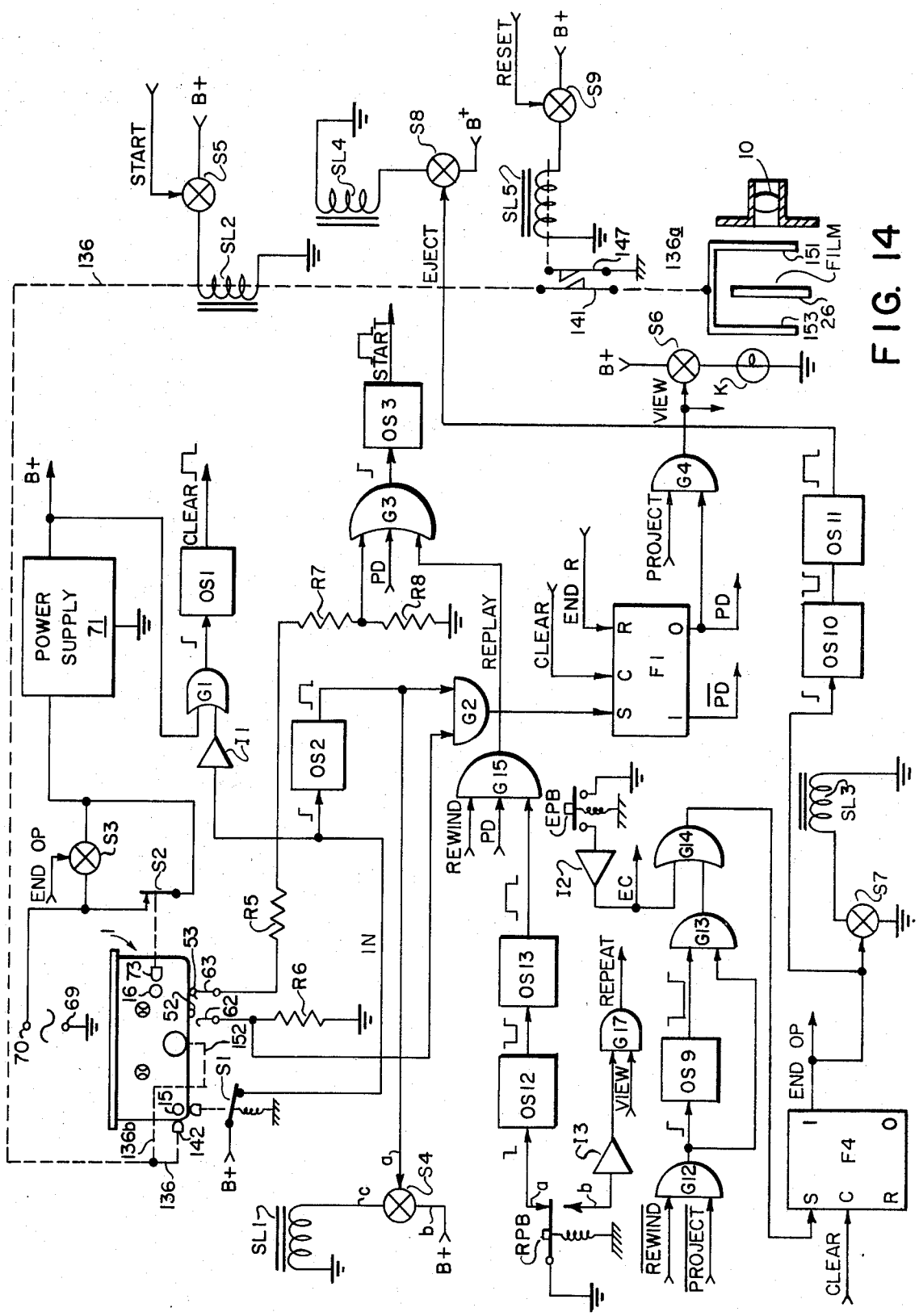
FIG. 14 is a schematic block and wiring diagram of control circuits forming a part of the apparatus of FIGS. 1 and 6.

FIG. 14 shows portions of the control apparatus of FIG. 6 in conjunction with the cassette 1. Certain of the elements described above are shown quite schematically in FIG. 14, but are given the same reference characters.

The switch S2 in FIG. 14 is shown in the closed position assumed when the locator pin 73 enters the port 16 in a cassette 1 as the cassette is inserted into the pocket 2 in the film drive and projection apparatus. In that position, alternating current is supplied from the input terminals 69 and 70 to the power supply 71. The DC power supply voltage B+ will then be produced. At the rising leading edge of the voltage B+, a conventional one-shot multivibrator OS1 is triggered through an OR gate G1 to produce a brief pulse labelled CLEAR. This pulse is used to reset a number of registers, as will appear.

The switch S1 is also shown in the closed position assumed when a cassette is in the housing 3. In that position, when the power supply potential B+ has appeared in response to the insertion of the locating pin as described above, a positive signal labelled IN is produced. The leading edge of this signal triggers a second conventional one-shot multivibrator OS2, to produce a positive output pulse having a longer duration than the CLEAR pulse produced by the multivibrator OS1. This pulse is used to sample the state of the terminals 52 and 53 to determine whether or not the film in the cassette 1 has been processed, as will appear. It is also used to close a conventional electronic switch S4.

The switch S4 may be of any conventional variety, having a control input terminal $a$ and load terminals $b$ and $c$. When a positive signal is applied to its control terminal $a$ with respect to its load terminal $c$, a closed circuit is presented between the terminals $b$ and $c$. That completes the circuit from B+ through the load terminals $b$ and $c$ of the switch S4 and through the winding of the solenoid SL1 to ground. A pulse of current is thus supplied to the solenoid SL1 to engage the drive sprockets 77 and 78 of the film drive and projection system of FIG. 6 with the corresponding drive sprockets 51 and 55 of the cassette 1 (FIG. 5).

The signal labelled IN is also supplied to the input terminal of a conventional inverter I1 that has its active output terminal connected to a second input terminal of the OR gate G1. The leading edge of the signal labelled IN does not affect the multivibrator OS1. However, when a cassette 1 is ejected and the switch S1 opens, the downward-going trailing edge of the signal IN triggers the multivibrator OS1 to produce a final CLEAR pulse, for purposes to appear.

The signal labelled IN also energizes a sensing circuit which extends through a resistor R5, through the terminals 63, 53, 52 and 62 in series, and through a resistor R6 to ground. The resistor R6 is selected to limit the current flowing through the sensing circuit while allowing the full supply potential B+ to appear across the terminals 53 and 52. The reason is that when the terminals 52 and 53 are internally bridged as described above, contact resistances of a relatively large magnitude may exist. Such contact resistances are substantially eliminated as current flow is established.

The resistor R6 is selected to produce a suitable output voltage for causing a conventional AND gate G2 to produce an output pulse, during the pulse produced by the multivibrator OS2, when the film in the cassette 1 is unprocessed as indicated by a closed circuit path existing across the terminals 52 and 53. The AND gate G2 may be of any conventional variety, and is provided with an output terminal connected to the set input terminal of a conventional flip-flop F1. The flip-flop F1 may be of any conventional variety adapted to be set by a pulse supplied to its set input terminal S, and to be reset either by a positive pulse supplied to its terminal R, or by a CLEAR pulse supplied to its CLEAR input terminal C. When set, the flip-flop F1 exhibits a positive potential at its logic 1 output terminal, labelled $\overline{PD}$, and a logic 0 output signal at its logic 0 output terminal, which may be assumed to be at ground when at logic 0. When reset, the flip-flop F1 produces an output level at logic 1, labelled PD, at its logic 0 output terminal.

When the flip-flop F1 is reset, the signal PD, combined with a signal labelled PROJECT, enables a conventional AND gate G4 to produce a signal labelled VIEW. When present, the signal VIEW closes a conventional electronic switch S6 to energize the projection lamp K.

The positive signal labelled IN is also applied to a potential divider comprising a pair of resistors R7 and R8 in series. The positive signal thus produced across the resistor R8 is applied to one input terminal of a conventional three input terminal OR gate G3.

The output terminal of the gate G3 is connected to the trigger input terminal of a third conventional one-shot multivibrator OS3. The rising leading edge of the signal IN thus triggers the multivibrator OS3 to produce a pulse, having a duration longer than the CLEAR pulse produced by the multivibrator OS1, labelled START.

One function of the START pulse is to close a conventional electronic switch S5 to supply a pulse of energizing current from the supply terminal at B+ to the winding of the solenoid SL2. This pulse actuates the solenoid SL2 to latch the blinders 151 and 153 into their open position, permitting the lamp K to transmit light through the film 26 to the lens 10.

The latch elements 141 and 147 are engaged upon the energization of the solenoid SL2, and retain the blinders in their open positions. At the same time, the pressure plate lifting assembly 152 is moved to lower the pressure plate in the cassette 1 into engagement with the film, and the snubber stop 142 is inserted into the port 15 in the housing of the cassette to stop the snubber roll.

The blinders 151 and 153 are returned to their closed position, the snubber stop 142 is disengaged, and the pressure plate is raised by the mechanism 152, when the solenoid SL5 is energized. A pulse of current for this purpose is supplied through a conventional electronic switch S9. The switch S9 is closed when a positive signal labelled RESET is produced, in a manner to be described below.

A group of circuits is provided which serve at times to disengage a cassette 1 from the housing of the film drive and projection apparatus and eject it. An initiating signal for this purpose is normally produced by a conventional AND gate G12. This gate has two input terminals which receive signals labelled $\overline{REWIND}$ and $\overline{PROJECT}$, produced in a manner to be described below.

The output terminal of the gate G12 is connected to the trigger input terminal of a conventional one-shot multivibrator OS9. When triggered by the rising leading edge of an output pulse from the gate G12, the multivibrator OS9 produces a negative output pulse having a duration sufficient to insure that the conditions $\overline{REWIND}$ and $\overline{PROJECT}$ are not present as transients.

The signal from the gate G12 and the output signal from the multivibrator OS9 are applied to two input terminals of a conventional AND gate G13. Thus, when the gate G12 produces a positive output signal, after the pulse from the multivibrator OS9 disappears, the gate G13 produces an output pulse that is supplied to one input terminal of a conventional OR gate G14.

The output terminal of the gate G14 is connected to the set input terminal of a conventional flip-flop F4 that is arranged to be reset by the CLEAR pulse supplied to its CLEAR input terminal C. When set, the flip-flop F4 produces a logic 1 output pulse, labelled END OP, at its logic 1 output terminal.

A second signal for setting the flip-flop F4 is at times produced when the pushbutton EPB is momentarily depressed. The pushbutton EPB is of the conventional normally open, spring-returned type, and when closed supplies a ground signal to the input terminal of a conventional inverter 12. The inverter 12 then produces a positive output signal labelled EC, which is applied to other circuits, to be described, and to the second input terminal of the gate G14 to cause setting of the flip-flop F4.

When the signal END OP is produced, it closes a conventional electronic switch S7 to supply operating current to the solenoid SL3. When energized, as described above, the solenoid SL3 unlatches the spindle plate 79 to retract the film drive sprockets 77 and 78.

The rising leading edge of the signal END OP triggers a conventional one-shot multivibrator OS10. The multivibrator OS10 produces a negative output pulse. The rising trailing edge of this output pulse triggers a one-shot multivibrator OS11. That causes the production of a positive pulse, labelled EJECT, from the multivibrator OS11 that closes a conventional electronic switch S8.

When closed, the switch S8 supplies operating current to the solenoid SL4 to cause withdrawal of the locating pin 73, opening of the switch S2, and ejection of the cassette 1 as described above. The purpose of the multivibrator OS10 is to delay production of the EJECT pulse, to allow the drive sprockets to clear the cassette before the cassette is ejected.

The pushbutton RPB is of the conventional spring-returned type having an armature connected to ground, and a normally engaged contact a connected to the trigger input terminal of a conventional one-shot multivibrator OS12. When depressed, the pushbutton RPB engages a second contact b to supply a ground signal to the input terminal of a conventional inverter I3. The armature and contacts of the switch RPB are connected to the system over the cable 32, as described above in connection with FIG. 6.

The output signal of the inverter I3 is applied to one input terminal of a conventional AND gate G17. A second input terminal of the AND gate G17 receives the signal VIEW from the gate G4. When the pushbutton RPB is depressed and the signal VIEW is present, the gate G17 produces a positive, or logic 1, output signal labelled REPEAT.

When the pushbutton RPB is depressed and then released, the transition toward ground triggers the multivibrator OS12 to produce a negative output pulse. The positive trailing edge of this pulse triggers a conventional multivibrator OS13 to produce a positive output pulse. This pulse is supplied to one input terminal of a conventional AND gate G15. The gate G15 also receives signals labelled REWIND and PD, positive when the signals are present. When all three terminals of the gate G15 are positive with respect to ground, a signal labelled REPLAY is supplied to a second input terminal of the OR gate G3. The leading edge of this REPLAY signal triggers the multivibrator OS3 to produce another START pulse.

A third input terminal of the gate G3 receives a signal PD, which goes positive when the flip-flop F1 is reset. Thus, when the flip-flop F1 is reset by an END R pulse produced in the manner described below, another START pulse is produced by triggering the one-shot multivibrator OS3 through the gate G3.

Figure 15:
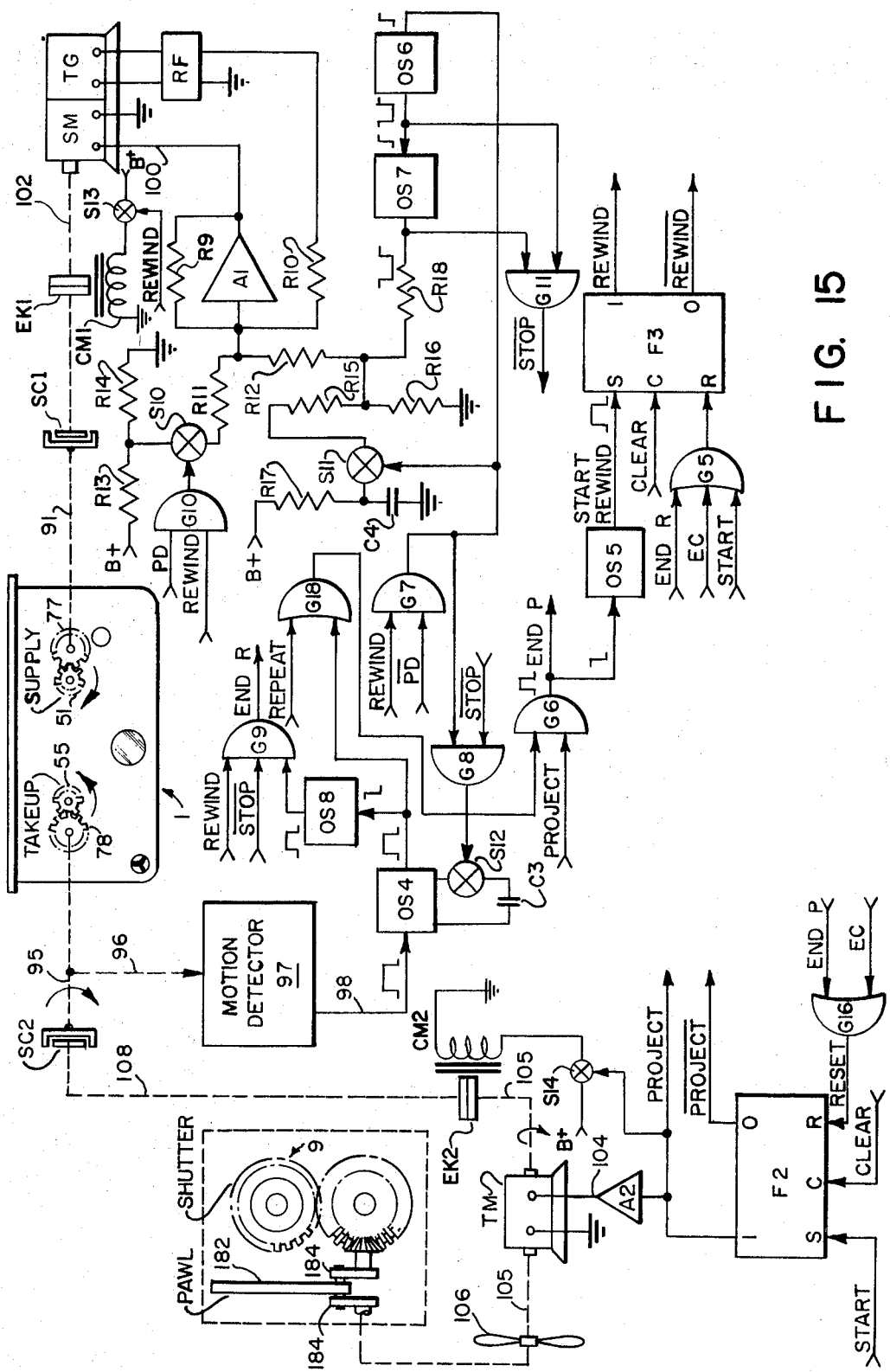
FIG. 15 is a schematic block and wiring diagram showing other portions of the control circuits of the apparatus of FIGS. 1 and 6.

FIG. 15 shows the control circuits for the DC motors TM and SM. As described above, the motor SM controls the supply reel drive shaft 91 and the associated drive sprockets 77, of the film drive and projection system, and 51, of the casette 1. The DC motor TM drives the fan 106, the pawl and shutter mechanism 109, and the takeup reel drive shaft 95 with its associated sprocket 78 adapted to engage the takeup reel drive sprocket 55 in the cassette 1.

The DC motor TM is supplied with energizing current, and the clutch magnet CM2 is energized, when a conventional flip-flop F2 is set. This flip-flop is set, to produce a positive signal labelled PROJECT at its logic 1 output terminal, when the START pulse is applied to its set input terminal S. The flip-flop F2 is initially set to its reset state by the CLEAR pulse applied to its input terminal C. It is also reset at times by a signal labelled RESET applied to its reset terminal R from a conventional OR gate G16.

The gate G16 has two input terminals, one of which receives a signal labelled END P, produced in a manner to be described, and the other one of which receives a signal labelled EC produced by the depression of the pushbutton EPB in FIG. 14 as described above. When reset, the logic 0 terminal of the flip-flop F2 produces a signal labelled $\overline{PROJECT}$ that is one of the enabling signals for the gate G12 in FIG. 14.

When the flip-flop F2 is set, the positive signal labelled PROJECT is applied to the input terminal of a conventional motor drive amplifier A2. The amplifier A2 then causes energizing current to be supplied to the motor TM. At the same time, the signal PROJECT closes an electronic switch S14 to connect the energizing winding CM2 of the clutch EK2 to the supply potential B+ to energize the clutch EK2.

The DC motor SM is supplied with current at times when a flip-flop F3 is set. The flip-flop F3 may be of any conventional construction adapted to be set by a START REWIND pulse applied to its set input terminal, and to be reset either by the CLEAR pulse applied to its clear input terminal C, or by a pulse applied to its reset terminal R by a conventional OR gate G5.

When set, the flip-flop F3 produces a positive signal labelled REWIND at its logic 1 output terminal. Among other functions, the signal REWIND closes an electronic switch S13 to supply energizing current 40 the winding CM1 of the electronic clutch EK1. When reset, the flip-flop F3 produces a positive signal labelled $\overline{REWIND}$ at its logic 0 output terminal.

The signal REWIND Is combined with the signals labelled PD and $\overline{PD}$ to select the speed or operation of the motor SM depending on whether or not the film in the cassette 1 has been processed. If it has not been processed, it is desired to operate the supply reel in a programmed mode including three steps.

First, the film will be moved a short distance to allow a tear-tab, that initially seals a container of processing composition in the cassette, to be detached from the container, allowing the processing composition to flow into the coating nozzle in the cassette. In order to allow this process time to occur without wasting film, it is then desired to interrupt the movement of the film onto the supply reel for a brief interval. Finally, the film is moved at constant linear speed past the coating station while the processing composition is applied to it.

These operations are initiated by a conventional AND gate G7. The gate G7 has two input terminals, one of which receives the signal labelled REWIND, and the other of which receives the signal $\overline{PD}$. It will be recalled that the signal PD is present at a level that is positive with respect to ground when the flip-flop F1 is set to indicate that the film in the cassette 1 has not been processed.

When these signals are both present, the gate G7 produces a logic 1 signal at its output terminal. At other times, a logic 0 signal is produced by the output terminal of the gate G7. This logic 1 signal closes a conventional electronic switch S11, for purposes to appear.

When the output signal from the gate G7 goes to 1, the positive-going transition triggers a conventional one-shot multivibrator OS6 to cause it to produce a negative output pulse for the interval, for example 0.4 seconds, during which it is desired to move the film onto the supply reel in the cassette to allow the opening of the container of processing composition. At the trailing edge of the pulse produced by the multivibrator OS6, the rising transition triggers a multivibrator OS7 to produce a negative output pulse. This pulse is produced for the interval during which it is desired to stop the film to allow the processing composition to flow onto the coating nozzle.

The output signals from the multivibrators OS6 and OS7 are applied to two input terminals of a conventional AND gate G11. When neither of the multivibrators OS6 and OS7 is producing an output pulse, the gate G11 produces a psotive signal labelled $\overline{STOP}$.

The signal $\overline{STOP}$ is applied to one input terminal of a conventional AND gate G8. A second input terminal of the gate G8 receives a signal from the output terminal of the gate G7. When this signal and the $\overline{STOP}$ signal are present, the gate G8 supplies a positive signal over its output terminal to close a conventional electronic switch S12.

The switch S12 is connected in series with a capacitor C3 that serves to modify the time constant of a conventional multivibrator OS4. The multivibrator OS4 has a triggering input terminal connected to the output lead 98 from the motion detector 97.

When the motion detector produces its positive output signal, and then ceases to produce the output signal, the negative going trailing edge of the pulse on the lead 98 triggers the multivibrator OS4 to produce a positive output pulse that has a first duration if the switch S11 is open, and a second and longer duration if it is closed. The trailing edge of the pulse produced by the multivibrator OS4 is connected to the trigger input terminal of another one-shot multivibrator OS8.

When triggered, the multivibrator OS8 produces a positive output pulse that is applied to one input terminal of a conventional AND gate G9. Other input terminals of the gate G9 receive the signals labelled REWIND and $\overline{STOP}$. When all these signals are present at positive levels with respect to ground, the gate G9 produces a signal labelled END R that resets the flip-flop F3 through the OR gate G5.

It will be apparent that the time, following the cessation of the motion detector signal on the lead 98, at which the END R pulse is produced, will depend on the duration of the pulse produced by the multivibrator OS4. For processed film, at the end of the projection cycle, it is desired to start rewind substantially as soon as the parts have stopped moving following the projection cycle. On the other hand, following the rewind cycle during which the film is processed, it is desired to allow approximately a 10 second delay so that all parts of the film can respond equally to the processing composition. For that purpose, the capacitor C3 increases the time constant of the multivibrator OS4 from, for example, 1 second, to approximately 10 seconds.

The output signal from the multivibrator OS4 is also applied to one input terminal of a conventional OR gate G18. A second input terminal of the gate G18 receives the signal REPEAT produced when the pushbutton RPB is depressed.

The output signal from the gate G18 is applied to one input terminal of a conventional AND gate G6. The other terminal of the gate G6 receives the signal PROJECT, positive when the flip-flop F2 is set.

When both input signals are positive, the gate G6 produces a pulse labelled END P. The trailing edge of this pulse triggers a multivibrator OS5, to produce a pulse labelled START REWIND that sets the flip-flop F3.

In addition to the END R pulse, the gate G5 receives a signal EC, produced when the pushbutton EPB is depressed as described above, and the START pulse, produced as described above. The EC pulse is used to interrupt a rewind operation if one is taking place when the pushbutton EPB is depressed. The same function is produced by the pulse EC applied to the OR gate G16, that resets the flip-flop F2 if the apparatus is in a PROJ- ECT mode of operation when the pushbutton is depressed.

The START pulse that resets the flip-flop F3 is effective when the flip-flop F3 has been set by depression of the pushbutton RPB, and the pushbutton is then released. That causes the apparatus to go back into the PROJECT mode of operation, in a manner and for purposes to appear. Other START pulses that are produced find the flip-flop F3 already reset.

As noted above, it is desired to move the film in the cassette 1 past the processing station at constant linear speed as it is coated with processing composition. Since the film is being wound onto a reel, as the radius on the reel increases, the same angular velocity of the reel will cause a greater linear speed. It can be shown that a DC motor controlling a reel upon which film is being wound will cause the film to move linearly if a current signal is applied to the motor that is decaying in a manner that can be approximated to a sufficient degree of accurracy by the discharge of a capacitor. Speed control circuits for this purpose will be described below.

Operating current for the DC motor SM is at times supplied over a lead 100 by a conventional amplifier A1. The amplifier A1 has a feedback resistor R9, and an input circuit comprising three summing resistors R10, R11 and R12.

The resistor R10 is connected between the active input terminal of the amplifier A1 and the output terminal 101 of a conventional rectifier and filter RF. The rectifier and filter RF receives an alternating signal from the tachometer generator TG and converts it to a DC potential on the lead 101 that is negative with respect to ground and is proportional in amplitude to the speed of the motor SM.

The resistor R11 is connected between the input terminal of the amplifier A1 and, over a normally open conventional electronic switch S10, to the junction of a potential divider comprising a pair of resistors R13 and R14 connected in series between the supply terminal at B+ and ground. The switch S10 has a control terminal connected to the output terminal of a conventional AND gate G10. This gate receives the signals PD and REWIND, and when both are present, the switch is closed to supply a constant voltage signal to the amplifier A1, causing the motor SM to run at a selected fast rewind speed.

The resistor R12 is connected between the input terminal of the amplifier A1 and to the junction of three resistors R15, R16 and R18. The resistors R15 and R16 are connected in series with a normally open electronic switch S11 to the junction of a capacitor C4 and a resistor R17.

A charging circuit for the capacitor C4 extends from the supply terminal at B+ through the resistor R17, and thence through the capacitor C4 to ground. The capacitor C4 is charged through this circuit essentially to B+ while the switch S11 is open. When the switch S11 is closed, the capacitor C4 discharges through the resistors R15 and R16 in parallel with the resistor R17, to produce a signal across the resistor R16 that decays at a rate selected to drive the film at constant speed past the processing station in the cassette 1.

The resistor R18 is connected to the output terminal of the multivibrator OS7. When the multivibrator OS7 produces its output pulse, the signal component across the resistor R16 is rendered ineffective for the duration of the pulse.

The switch S11 has a control terminal connected to the output terminal of the gate G7, such that the switch is closed when the gate produces a positive signal with respect to ground in response to the presence of the sigansl REWIND and $\overline{PD}$. The leading edge of this signal triggers the one-shot multivibrator OS6, producing a pulse that triggers the multivibrator OS7 at its trailing edge. When the switch S11 is closed, a signal that is positive with respect to ground and decaying with time is applied to the amplifier A1 to cause the motor SM to run at an angular velocity which will result in a linear constant film speed within the cassette. At the end of the pulse produced by the multivibrator OS6, the pulse produced by the multivibrator OS7 will cancel the signal across the resistor R16 for the duration of the pulse, causing the motor to stop for an interval. Thereafter, the motor SM will continue to run in response to the decaying signal supplied across the resistor R16, until the signal REWIND is removed from the gate G7 to cause the switch S11 to be opened.

As noted above, the gate G17 at times produces a positive signal labelled REPEAT that is applied through an OR gate G18 in FIG. 15 to one input terminal of the gate G6. As the signal PROJECT will be present when the signal VIEW is present, the gate G6 will produce an output pulse labelled END P that will reset the flip-flop F2. This pulse is self-limiting regardless of the time during which the pushbutton RPB is depressed, as it will disappear as soon as the flip-flop F2 is reset.

At the trailing edge of the pulse END P, the multivibrator OS5 will be triggered to set the flip-flop F3 as described above. The apparatus will then begin to rewind the film onto the supply reel in the cassette, until the pushbutton RPB is released.

Referring again to FIG. 14, when the pushbutton RPB is released, closing its contact a, the one-shot multivibrator OS12 will be triggered to produce a negative output pulse selected to have a duration equal to a desired minimum rewind time for returning a predetermined number of frames onto the supply reel. At the end of the pulse produced by the multivibrator OS12, the multivibrator OS13 is triggered to produce an output pulse. This pulse is applied to the AND gate G15. Other terminals of the gate G15 receive the signals REWIND and PD. The signal PD is included to be sure that the replay button will have no effect on a cassette having unprocessed film, or film which is in the process of development. When all of the signals at the input of the gate G15 are positive, a signal labelled REPLAY is produced at a positive level, and this signal is supplied through the OR gate G3 to trigger the one-shot multivibrator OS3 to produce another START pulse that will set the flip-flop F2 in FIG. 15. That will cause projection to resume.

Having described the construction of the system, its operation will next be discussed. Referring now to FIGS. 1, 6, 14 and 15, prior to the insertion of a cassette 1 into the pocket 2 of the film drive and projection apparatus 4, the latter will be in a standby condition with power off. As seen in FIG. 6, the open switches S2 and S3 prevent the energization of the power supply 71.

The drive sprockets 77 and 78 are held in their retracted position by the springs 84 engaging the spindle plate 79. The pedal 25 is in its raised position, and the yoke 129 holds the locating pin 73 in its retracted position. The snubber stop 142 is held in its retracted position by the spring 144. The switch S1 is open. The blinders 151 and 153 are in their closed positions, and the pressure plate control mechanism 152 is in its raised position. The lamp K is deenergized.

When a cassette 1 is inserted into the pocket 2, referring to FIGS. 6 and 8, the pedal 25 will be depressed to withdraw the yoke 129 and allow the locating pin 73 to contact the cassette and be driven into its port 16. That action will compress the ejecting spring 132 in FIG. 8, and the locating pin will latch the cassette into position in the pocket 2. At the same time, the tear-tab release mechanism described above in the above-cited copending application will be enabled by the locating pin. The switch S1 will be closed and the switch S2 will be closed as soon as the locating pin enters the cassette.

Referring next to FIG. 14, when the switch S2 closes, power will be applied to the power supply 71 and the DC supply voltage B+ will appear. That will cause the multivibrator OS1 to be triggered through the gate G1, producing a CLEAR pulse that will ensure that the flip-flops F1, F2, F3 and F4 are in their reset states.

The rising leading edge of the B+ supply will be applied over the closed contacts of the switch S1 to trigger the multivibrator OS2. The terminals 62 and 63 are now in engagement with the terminals 52 and 53 on the cassette. Assuming that the cassette contains unprocessed film, a closed path will appear between the terminals 52 and 53. Voltage will thus appear across the resistor R6. The gate G2 is now enabled by the pulse from the multivibrator OS2, so that the flip-flop F1 will be set to produce the signal $\overline{PD}$.

The signal labelled IN applied across the resistors R7 and R8 will cause the gate G3 to produce a pulse to trigger the multivibrator OS3. That will produce a START pulse. The START pulse will set the flip-flop F2 in FIG. 15.

When the START pulse is produced, it closes the switch S5 to supply a pulse of energizing current to the solenoid SL2. Referring to FIGS. 6, 7, 9, 10 and 11, this action causes the snubber stop 142 to protrude through the port 23 and enter the cassette, to stop the snubber roll. At the same time, the pressure plate lifting arms 152 are moved down to allow the pressure plate 57 in the cassette to engage the film 26. The blinders 151 and 153 are moved to their open positions. These parts are latched in placed by the elements 141 and 147, as shown in FIG. 7.

At the same time, the pulse produced by the multivibrator OS2 closes the switch S4 to supply a pulse of energizing current to the solenoid SL1. Referring to FIG. 6, that will move the spindle plate 79 towards the wall 18, bringing the sprockets 77 and 78 into driving engagement with the supply and takeup reels of the cassette.

With the flip-flop F2 in FIG. 15 set, the clutch EK2 will be energized and the DC motor TM will operate, causing the fan 106 and the pawl and shutter 109 to operate, and driving the supply shaft 95 through the slip clutch SC2. The film will advance onto the takeup reel, until the second elongated sprocket hole 40 on the film 26 is reached (FIG. 4), causing the pawl to slip and the film to stop.

When the takeup shaft 95 is moving, the motion detector 97 will produce an output signal that is positive with respect to ground as long as the takeup shaft continues to move.

During the advance of the film onto the takeup reel, a pressure pad forming part of the processing apparatus engages the film and then urges it into contact with the coating nozzle. That prepares the processing apparatus for operation on the first rewind cycle.

When the film in the cassette 1 reaches the second elongated sprocket hole 40 in FIG. 4, the film drive pawl will cease to advance the film and the takeup drive shaft 95 in FIG. 6 will stop. That will cause the decay of the signal produced by the motion detector, which will fall. This falling signal will trigger the multivibrator OS4 in FIG. 15, causing it to produce an output pulse of short duration. This pulse is applied through the gate G18 to enable the gate G6. Since the flip-fop F2 is set, with the level PROJECT present, the gate G6 produces an END P pulse that causes the flip-flop F2 to be reset by the RESET pulse produced by the gate G16. The trailing edge of the END P pulse triggers the multivibrator OS5 to produce a START REWIND pulse that sets the flip-flop F3.

The RESET pulse also closes the switch S9 in FIG. 14 to supply a pulse of energizing current to the solenois SL5. That action releases the latch elements 141 and 147 and allows the blinders 151 and 153 to return to their closed positions, retracts the snubber stop 142 under the influence of the spring 144, and allows the pressure plate lifting arm 152 to raise the pressure plate out of engagement with the film 26 in the cassette.

Referring again to FIG. 15, with the flip-flop F3 set and producing the level REWIND, and the flip-flop F1 in FIG. 14 set, the gate G7 in FIG. 15 produces a positive output signal. The leading edge of this signal triggers the multivibrator OS6 to produce a negative pulse. The immediate result is to remove the signal $\overline{STOP}$ produced by the gate G11, and thereby disable the gates G8 and G9. The gate G8 will thus not change the time constant of the multibrator OS4 as yet, and the gate G9 is rendered unable to produce and END R pulse, although it may be supplied with an input pulse from the multivibrator OS8 that is produced at the trailing edge of a pulse produced by the multivibrator OS4 when the film motion is interrupted by the multivibrator OS7.

The output signal from the gate G7 closes the switch S11. The previously charged capacitor C4 now begins to discharge through the resistor R16, supplying a decaying positive drive signal to the amplifier A1 through the resistor R12. The motor SM will now drive the supply reel drive shaft 91 in FIG. 6, causing film to begin moving onto the supply reel. This movement is continued for a brief interval, until for example about 8 inches of film have been moved onto the supply reel, during which time the tear-tab release mechanism within the cassette functions to open the container of processing composition and supply it to the coating nozzle for application to the film. Next, the multivibrator OS7 is triggered at the trailing edge of the pulse produced by the multivibrator OS6. That produces a negative pulse that keeps the gate G11 disabled, and also overcomes the signal supplied across the resistor R16 to cause the motor SM to stop.

The signal from the motion detector 97 may fall during this time. Thus, the multivibrator OS4 will be triggered. The switch S12 will remain open, because the gate G8 is disabled by the absence of the signal $\overline{STOP}$. Thus, the multivibrator OS4 produces a short duration output pulse. The trailing edge of this pulse triggers the multivibrator OS8, which produces an output pulse.

However, this pulse is ineffective to produce an END R pulse through the gate G9, because the signal $\overline{STOP}$ is absent.

At the end of the pulse produced by the multivibrator OS7, the motor SM will resume operation under the control of the capacitor C4, as modified by the feedback control supplied through the resistor R10, causing the film to be moved past the processing station at constant linear speed. The motion detector output on the lead 98 will again rise, although this rise does not affect the multivibrator OS4.

The gate G11 again produces the level $\overline{STOP}$. That action enables the gate G8, which receives a second positive signal from the gate G7. The switch S12 is now closed, causing the capacitor C3 to increase the time constant of the multivibrator OS4 to the 10 second interval described above.

As the film is wound onto the supply reel, it is coated with processing composition. At the end of the run, the end of the film on the takeup reel is encountered, and the shaft 95 will stop, causing the shaft 91 to stop.

The motor SM will continue to drive the shaft 103, but the shaft 91 will be stopped by slippage of the clutch SC1. With the shaft 95 stopped, the motion detector 97 will produce a falling output signal, which will trigger the multivibrator OS4 to produce an output pulse of 10 seconds duration.

The trailing end of this pulse will trigger the multivibrator OS8, which will now cause the gate G9 to produce an END R pulse. That pulse resets the flip-flop F3.

Referring to FIG. 14, the pulse END R which resets the flip-flop F3 will also reset the flip-flop F1, causing the level PD to be produced. The rising leading edge of this signal will be applied through the gate G3 to trigger the multivibrator OS3 to produce another START pulse. That pulse will energize the solenoid SL2 by closing the switch S5, causing the snubber to be inserted again, the blinders to be opened, and the pressure plate to be lowered into engagement with the film 26.

The START pulse will set the flip-flop F2 in FIG. 15. That will produce the signal PROJECT, causing the motor TM to drive the fan 106, the shutter mechanism 109, and the takeup drive shaft 95. At the same time, referring to FIG. 14, with the level PD present and the signal PROJECT present, the gate G4 will produce a signal VIEW to close the switch S6 and energize the projection lamp K.

The film will now be advanced by the pawl 182, as successive frames are projected onto the viewing screen. The motion detector will again produce a positive output signal.

During the viewing operation, it may be desirable to replay portions of the film. For this purpose, the pushbutton RPB may be depressed.

With the signal VIEW present, depressing the pushbutton RPB will cause the signal REPEAT to be produced by the gate G17. That signal will be supplied through the gate G18 in FIG. 15 to the gate G6.

With the level PROJECT present, the gate G6 will produce an END P signal that will reset the flip-flop F2. That will stop the motor TM. The trailing end of the END P pulse, produced when the flip-flop F2 is reset, will trigger the multivibrator OS5 to produce another START REWIND pulse. That will set the flip-flop F3.

With the signal PD present, and the level REWIND now present, the gate G10 will close the switch S10 to supply a constant speed signal to the amplifier A1 to drive the DC motor SM at constant angular velocity to rewind a segment of the film. If the operator simply continues to hold the pushbutton RPB in FIG. 14 down, rewinding will continue until the end of the film on the takeup reel is encountered, whereupon the motion detector will cease to produce its output pulse and will trigger the multivibrator OS4 to produce its short duration output pulse.

The pulse from the multivibrator OS4 will trigger the multivibrator OS8 to produce an END R pulse which will reset the flip-flop F3 and stop the motor SM. Referring to FIG. 14, if the pushbutton RPB is held down for the duration of the pulse produced by the multivibrator OS9 with both levels $\overline{REWIND}$ and $\overline{PROJECT}$ present, the gate G13 will supply a pulse through the gate G14 to set the flip-flop F4 and cause a terminating sequence, to be described below, to take place.

However, if the operator releases the push-button RPB before the multivibrator OS9 times out, the multivibrator OS12 will be triggered. At the end of its output pulse, the multivibrator OS13 will be triggered to produce its output pulse. If the apparatus is still in the REWIND state, with the flip-flop F3 set, and the level PD present, the gate G15 will produce a replay signal that will trigger the multivibrator OS3 through the gate G3 to produce another START pulse. That will set the flip-flop F2 in FIG. 15, causing the apparatus to resume projection from the point to which the film was then rewound.

Brief depression and release of the pushbutton RPB will cause the same sequence of operations, except that the film will only be rewound for the duration of the pulse produced by the multivibrator OS12 if the pushbutton RPB is released with sufficient rapidity. Thus, the operator may select a review of either a predetermined increment of frames, or of the whole film, by controlling the length of time that the pushbutton RPB is depressed.

If the pushbutton RPB is released when the apparatus happens to be in the rewind state with processed film, the REPLAY pulse will again be produced as described above, causing the apparatus to resume projection. However, the reprojection operation that occurs is harmless, and can be defeated by simply depressing the pushbutton RPB and holding it down until the apparatus ejects the cassette.

Assuming that the apparatus is in the process of projecting film, with the flip-flop F2 set and the motor TM operating, projection with the lamp on and the blinders open will continue until the second elongated sprocket hole 40 on the film 26 is encountered by the pawl 182, whereupon the shaft 95 will stop. The motion detector output on the lead 98 will again fall, triggering the multivibrator OS4 to produce an output pulse. That pulse, applied through the gate G18 to the gate G6, will cause an END P pulse to be produced that will reset the flip-flop F2. The END P pulse will close the switch S9 in FIG. 14 to energize the solenoid SL5 and release the latch 147 so that the pressure plate will be raised away from the film, the snubber stop will be retracted, and the blinders will be returned to their closed positions.

The trailing edge of the END P pulse will trigger the multivibrator OS5 to produce a START REWIND pulse that will set the flip-flop F3. The gate G10 will now be enabled to close the switch S10 and cause the motor SM to operate in a fast rewind mode.

Fast rewind will continue until the end of the film on the takeup reel is reached, whereupon the shaft 95 will stop and the motion detector output will fall. That will cause the END R pulse to be produced as described above, which will reset the flip-flop F3 through the gate G5. Both the flip-flops F2 and F3 are now reset. The gate G12 in FIG. 14 will produce a rising transition as soon as the flip-flop F3 is reset, triggering the multivibrator OS9. The pulse produced by the multivibrator OS9 will disable the gate G13.

After the pulse from the multivibrator OS9 disappears, the gate G13 will set the flip-flop F4 through the gate G14. That will produce the signal END OP, which will close the switch S7 to supply a pulse of current to the solenoid SL3.

Referring to FIG. 6, the solenoid SL3 will release the latch 85 and allow the spindle plate 79 to be driven back by the springs 84, disengaging the drive sprockets 77 and 78. At the same time, the multivibrator OS10 will be triggered to produce its output pulse.

At the trailing edge of the pulse from the multivibrator OS10, the multivibrator OS11 will be triggered to produce its output pulse, which will close the switch S8 and supply a pulse of energizing current to the solenoid SL4. Referring to FIG. 6, the solenoid SL4 will retract the locating pin.

The cassette 1 is now free to be ejected by the action of the pedal 25 impelled by the spring 132 in FIG. 8. When the flip-flop F4 is set, it closes the switch S3 for the duration of the brief interval during which the switch S2 is opened by the locating pin 73 and before the CLEAR pulse is produced by the multivibrator OS1 in response to the opening of the switch S1. When the multivibrator OS1 produces the final CLEAR pulse, all of the flip-flops will be reset, including the flip-flop F4, and the apparatus will be restored to its initial condition.

The eject pushbutton EPB may be depressed at any point in the operation of the apparatus. When depressed, it will force the termination of operations by setting the flip-flop F4 through the gate G14. When the pushbutton EPB is depressed, the signal EC will reset either flip-flop F2 or F3 that is set. The signal RESET produced by the gate G16 that resets the flip-flop F2 will also close the switch S9 to supply a pulse of current to the solenoid SL5 so that the snubber stop 142 will be retracted if it has not already been retracted.

As operation of the eject pushbutton will damage the film in a cassette if the film has not been processed, it may be desirable to gate the signal EC with the signal PD, so that the cassette cannot be prematurely ejected until the flip-flop F1 is reset.

Operation of the system in response to the insertion of a cassette containing initially processed film is the same as that described above in conjunction with manipulation of the film in the cassette after it has been processed. Specifically, the flip-flop F1 is not initially set, because the terminals 52 and 53 on the cassette 1 initially present an open circuit. When the cassette is inserted, the power supply is energized over the switch S2 as before, producing the B+ signal that energizes the rest of the apparatus and triggers the multivibrator OS1 to produce the CLEAR pulse, resetting all of the flip-flops. The multivibrator OS2 is triggered to produce its output pulse, which serves to close the switch S4 and engage the drive sprockets by energization of the solenoid SL1. The START pulse is produced by the multivibrator OS3, setting the flip-flop F2 and causing the motor TM to drive the takeup shaft 95, the pawl and shutter 109, and the fan 106.

With the flip-flop F1 initially reset and remaining reset, the gate G4 produces the signal VIEW to close the switch S6 and energize the lamp K. Accordingly, operation begins with the projection of the processed film. The solenoid SL2 is energized by closing the switch S5 with the START pulse. At the end of projection, the motion detector 97 triggers the multivibrator OS4 to produce the pulse that triggers the multivibrator OS5 through the gates G18 and G6. The output of the gate G6, labeled END P, resets the flip-flop F2. The RESET pulse produced by the gate G16 energizes the solenoid SL5, to prepare the apparatus for the rewind operation.

The pulse from the multivibrator OS5 then sets the flip-flop F3, to start the supply drive motor SM in the fast rewind mode with the switch S10 closed by the gate G10. Fast rewind continues until the end of the film is reached as before, whereupon the flip-flop F3 is reset and the flip-flop F4 will be set at the end of the pulse produced by the multivibrator OS9. That will cause termination of operations by sequential energization of the solenoids SL3, to retract the drive mechanism, and SL4, to retract the locating pin and cause the cassette to be ejected.

While the invention has been described with respect to the details of a specific embodiment thereof, many changes and variations will occur to those skilled in the art upon reading the above description. Such can obviously be made without departing from the scope of the invention.

Having thus described the invention, what is claimed is:

1. In combination, a photographic cassette containing a strip of film transportable in opposite directions through a film gate for the exposure and projection of successive increments of film passing through said gate, a housing adapted to engage said cassette, a viewing screen mounted on said housing, latching means mounted in said housing and responsive to engagement of said housing and said cassette for releasably latching said cassette to said housing, drive means mounted in said housing and responsive to engagement of said housing and said cassette for transporting said film through a predetermined sequence of movements through said film gate, optical means mounted in said housing and operable to focus sequential images of a portion of that film in said film gate on said screen, control means for operating said optical means when said drive means is transporting said film through one of said movements, first manually operable means effective when said optical means is operating for interrupting the operation of said optical means and reversing said sequence of movements for an interval determined by the interval of operation of said first manually operable means, means controlled by said drive means for releasing said latching means after said sequence of movements of said film has been completed, and second manually operable means effective when operated for interrupting the operation of said drive means and said optical means and releasing said latching means.

2. In combination, a photographic cassette containing a strip of film transportable in opposite directions through a film gate for the exposure and projection of successive increments of film passing through said gate, processing means in said cassette enabled by an applied signal to respond to the transportation of said film for processing the film, a support adapted to engage said cassette, latching means mounted on said support and responsive to engagement of said support and said cassette for releasably latching said cassette to said support, means controlled by said latching means for applying an enabling signal to said processing means, drive means mounted on said support and responsive to engagement of support and said cassette for transporting said film through a predetermined sequence of movements through said film gate, first manually operable means operatively connected to said drive means and effective when operated to reverse said sequence of movements for an interval determined by the interval of operation of said first manually operable means, means controlled by said drive means for releasing said latching means after said film has been processed, and second manually operable means effective when operated to interrupt said drive means and release said latching means.

3. Photographic apparatus for manipulating a film cassette including a strip of film mounted for movement between two terminal positions, said apparatus comprising, in combination: housing means forming a receptacle configured to receive the cassette; releaseable latching means responsive to the insertion of a cassette in said receptacle for securing the cassette in said receptacle, reversible drive means in said housing means engageable with the film in a cassette received in said receptacle and selectively operable to drive the film in the cassette in each of two opposite directions until one of the terminal positions is reached, sequencing means controlled by said drive means for reversing the direction of said drive means when one of the terminal positions of the film in a cassette received in said receptacle is reached, first manually operable means effective to reverse the direction of said drive means for an interval dependent on the interval of operation of said first manually operable means, and second manually operable means for releasing said latching means.

4. The apparatus of claim 3, further comprising means for ejecting a cassette from said receptacle after said latching means has been released.

5. Photographic apparatus for manipulating a film cassette containing a strip of film, film transport means for advancing and rewinding the film, and processing means operable to process the film, said apparatus comprising, a housing, means forming a receptacle in said housing configured to receive the cassette, releaseable latching means responsive to the insertion of a cassette in said receptacle for securing the cassette in said receptacle, reversible drive means in said housing engageable with the film transport means in a cassette in said receptacle and selectively operable to advance and rewind the film, sensing means in said housing for detecting whether or not the film in a cassette in said receptacle has been processed, projecting means in said housing energizable to project the film in a cassette in said receptacle, sequencing means in said housing, said sequencing means comprising means responsive to the insertion of a cassette in said housing for engaging said drive means, means controlled by said sensing means for operating said drive means to rewind the film and operating the processing means when the film in a cassette in said receptacle has not been processed, means controlled by said sensing means for operating said drive means to advance the film and energize said projecting means when the film in a cassette in said receptacle has been processed, and means effective when the film in a cassette in said receptacle has been projected for operating said drive means to rewind the film, ejecting means responsive to an applied signal for releasing said latching means and ejecting the cassette, means controlled by said sequencing means for applying a signal to said ejecting means after the film in a cassette in said receptacle has been projected and rewound, first manually operable means for sequentially producing first and second signals, means controlled by said first manually operable means, said sequencing means and said sensing means for reversing the direction of operation of said drive means to rewind the film and deenergizing said projection means when said projection means is energized and said first signal is produced, means controlled by said first manually operable means, said sequencing means and said sensing means for reversing the operation of said drive means to advance the film and energizing said projection means when said second signal is produced, second manually operable means for producing a third signal, means responsive to said third signal for interrupting the operation of said sequencing means, means responsive to said third signal for disengaging said drive means, and means responsive to said third signal for applying a signal to said ejecting means.

6. A film drive and projection system for use with a film cassette including strip of film mounted for movement in opposite senses between first and second terminal positions and processing means operable to process the film upon movement of the film to its first terminal position and then to its second terminal position, said system comprising a housing, wall means in said housing forming a receptacle shaped to receive the cassette, means forming an optical path through said wall means and through a portion of the film in a cassette in said receptacle, a projection lamp in said housing energizable to transmit light over said path, disengageable latching means in said housing responsive to the insertion of a cassette in said receptacle to engage the cassette and hold the cassette in said receptacle, reversible drive means in said housing engageable with the film in a cassette in said receptacle and selectively operable to move the film to either of said terminal positions, sensing means in said housing for detecting whether or not the film in a cassette in said receptacle has been processed, ejecting means operable to eject a cassette from said receptacle, means responsive to the insertion of a cassette in said receptacle for engaging said drive means, means actuated when said drive means is engaged for operating said drive means to move the film in a cassette in said receptacle to its first terminal position, means controlled by said sensing means and said drive means to operate said drive means to move the film to its second terminal position when the film in a cassette in said receptacle has been moved to its first terminal position and has not been processed, means responsive to said drive means when the film reaches its second terminal position for energizing said lamp, means controlled by said sensing means and said drive means for operating said drive means to move the film in a cassette in said receptacle to its first terminal position when the film is in its second terminal position and has been processed, means responsive to said drive means when the film reaches its first terminal position for deenergizing said lamp and operating said drive means to move the film to its second terminal position, means responsive to said drive means when the film reaches its second terminal position and controlled by said sensing means for disengaging said drive means and said latching means when the film has been processed, means controlled by said sensing means when said latching means is disengaged for operating said ejecting means, first manually operable means for sequentially producing first and second control signals at an interval dependent on the interval of operation of said first manually operable means, means controlled by said sensing means and responsive to said first control signal for reversing said drive means when said drive means is moving the film towards its first terminal position and has been processed, means responsive to said second signal for reversing said drive means when said drive means is moving the film towards its second terminal position, second manually operable means for producing a third control signal, means responsive to said third control signal for disengaging said drive means and said latching means, and means responsive to said third control signal for operating said ejecting means.

7. In combination, a photographic cassette containing a strip of film transportable in opposite directions through a film gate for the exposure and projection of successive increments of film passing through said gate, processing means in said cassette operable to process the film, a support adapted to engage said cassette, latching means mounted on said support and responsive to engagement of said support and said cassette for releasably latching said cassette to said support, drive means mounted on said support and engageable with said film for transporting said film through a predetermined sequence of movements through said film gate, means controlled by said drive means for releasing said latching means after said film has been processed, first manual control means connected to said drive means and operable to reverse said sequence of movements for an interval dependent on the interval of operation of said first manual control means, and second manual control means operable to disengage said drive means and release said latching means.

8. Photographic apparatus for manipulating a film cassette including a strip of film mounted for movement between two terminal positions, and processing means operable to process the film, said apparatus comprising, in combination: housing means forming a receptacle configured to receive the cassette; reversible drive means in said housing means engageable with the film in a cassette received in said receptacle and selectively operable to drive the film in the cassette in each of two opposite directions until one of the terminal positions is reached, sequencing means controlled by said drive means for reversing the direction of said drive means when one of the terminal positions of the film in a cassette received in said receptacle is reached, means for operating the processing means in a cassette received in said receptacle when the film in the cassette has not been processed, first manual means operable to produce sequentially first and second signals at an interval dependent on the interval of operation of said first manual means, means responsive to said first signal for reversing the direction of said drive means, means responsive to said second signal for reversing the direction of said drive means, second manual means operable to produce a third signal, and ejecting means responsive to said third signal for disengaging said drive means and ejecting a cassette in said receptacle.

9. Photographic apparatus for manipulating a cassette comprising a housing and a strip of film movably mounted in the housing, said apparatus comprising means forming a receptacle configured to receive the cassette, optical means energizable to project images of sequential increments of the film in the cassette when the cassette is in said receptacle, drive means engageable with the film in the cassette when the cassette is in said receptacle to move the film in the housing, projection means controlled by said sensing means for energizing said optical means and engaging said drive means for projecting images on the film, first manually operable means for sequentially producing first and second signals, means responsive to said first signal for interrupting the operation of said projection means and moving the film back to a previously projected position, means responsive to said second signal for resuming the operation of said projection means, and second manually operable means for disengaging said drive means.

* * * * *